(12) United States Patent
Ueda

(10) Patent No.: US 11,889,036 B2
(45) Date of Patent: Jan. 30, 2024

(54) IMAGE FORMING SYSTEM AND METHOD FOR DETERMINING SETTING OF IMAGE FORMING SYSTEM

(71) Applicant: KONICA MINOLTA, INC., Tokyo (JP)

(72) Inventor: Akio Ueda, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/719,534

(22) Filed: Apr. 13, 2022

(65) Prior Publication Data
US 2022/0360680 A1   Nov. 10, 2022

(30) Foreign Application Priority Data

May 6, 2021   (JP) .................................. 2021-078753

(51) Int. Cl.
*H04N 1/387*   (2006.01)
*H04N 1/00*   (2006.01)

(52) U.S. Cl.
CPC ..... *H04N 1/00822* (2013.01); *H04N 1/00411* (2013.01); *H04N 1/3873* (2013.01)

(58) Field of Classification Search
CPC . H04N 1/00822; H04N 1/3873; H04N 1/2384
See application file for complete search history.

(56) References Cited

U.S. PATENT DOCUMENTS

| | | | | |
|---|---|---|---|---|
| 6,411,396 | B1 * | 6/2002 | Benson | G06K 15/1857 358/1.9 |
| 7,016,068 | B1 * | 3/2006 | Gnocato | G06F 40/103 358/1.9 |
| 7,177,045 | B2 * | 2/2007 | Goel | G06K 15/02 715/251 |
| 2002/0048413 | A1 * | 4/2002 | Kusunoki | H04N 1/00427 358/1.18 |
| 2002/0074793 | A1 * | 6/2002 | Glenn | B42D 15/02 283/62 |
| 2002/0097447 | A1 * | 7/2002 | Matthews | H04N 1/3875 358/450 |

(Continued)

FOREIGN PATENT DOCUMENTS

| | | | | |
|---|---|---|---|---|
| CN | 107666547 A | * | 2/2018 | ......... H04N 1/00005 |
| JP | 2004248262 A | * | 9/2004 | ............. G03G 15/36 |

(Continued)

*Primary Examiner* — Ted W Barnes
(74) *Attorney, Agent, or Firm* — BUCHANAN INGERSOLL & ROONEY PC

(57) ABSTRACT

Provided is an image forming system in which an image forming apparatus is connected to a post-processing apparatus having a function of trimming. The image forming system includes: a repeat setting part that determines either: a setting of a scan size of a scan image per one printed reproduction of the scan image, the one printed reproduction being to be laid out by imposition of the scan image; or a setting of the imposition of the scan image according to the scan size of the scan image; a trimming setting part that determines either: a setting of a card size of cards to be obtained by trimming a recording medium; or a setting of a trimming area for the cards; and a coordination part that coordinates the repeat setting part and the trimming setting part.

8 Claims, 21 Drawing Sheets

(56) References Cited

U.S. PATENT DOCUMENTS

| | | | | |
|---|---|---|---|---|
| 2003/0020956 A1* | 1/2003 | Goel | | G06K 15/02 |
| | | | | 358/1.18 |
| 2004/0150856 A1* | 8/2004 | Asai | | G03G 15/36 |
| | | | | 358/1.18 |
| 2006/0098071 A1* | 5/2006 | Tanabe | | B41J 11/68 |
| | | | | 347/101 |
| 2006/0279812 A1* | 12/2006 | Shiba | | G03G 15/5095 |
| | | | | 358/468 |
| 2007/0273914 A1* | 11/2007 | Hosoda | | G06F 40/103 |
| | | | | 358/1.14 |
| 2007/0285724 A1* | 12/2007 | Saito | | G06F 3/125 |
| | | | | 358/1.18 |
| 2012/0307294 A1* | 12/2012 | Matsuda | | G06F 3/1219 |
| | | | | 358/1.15 |
| 2014/0154030 A1* | 6/2014 | Kimura | | B65H 37/04 |
| | | | | 412/1 |
| 2016/0307076 A1* | 10/2016 | Muthupandi | | G06K 15/1868 |
| 2018/0255186 A1* | 9/2018 | Takeo | | G06F 3/1274 |
| 2018/0278771 A1* | 9/2018 | Granby | | H04N 1/00708 |
| 2019/0056895 A1* | 2/2019 | Herrmann | | H04N 1/00567 |
| 2020/0244817 A1* | 7/2020 | Tanaka | | G06F 3/1208 |
| 2020/0296241 A1* | 9/2020 | Konishi | | H04N 1/00466 |
| 2020/0301713 A1* | 9/2020 | Oishi | | G06F 16/9035 |

FOREIGN PATENT DOCUMENTS

| | | | | |
|---|---|---|---|---|
| JP | 2006137528 A | | 6/2006 | |
| JP | 2007326285 A | * | 12/2007 | ........... G06F 3/1208 |
| JP | 2018019203 A | * | 2/2018 | ......... H04N 1/00005 |
| JP | 2020188316 A | * | 11/2020 | |
| JP | 6992401 B2 | * | 1/2022 | ........... G06F 3/1219 |

* cited by examiner

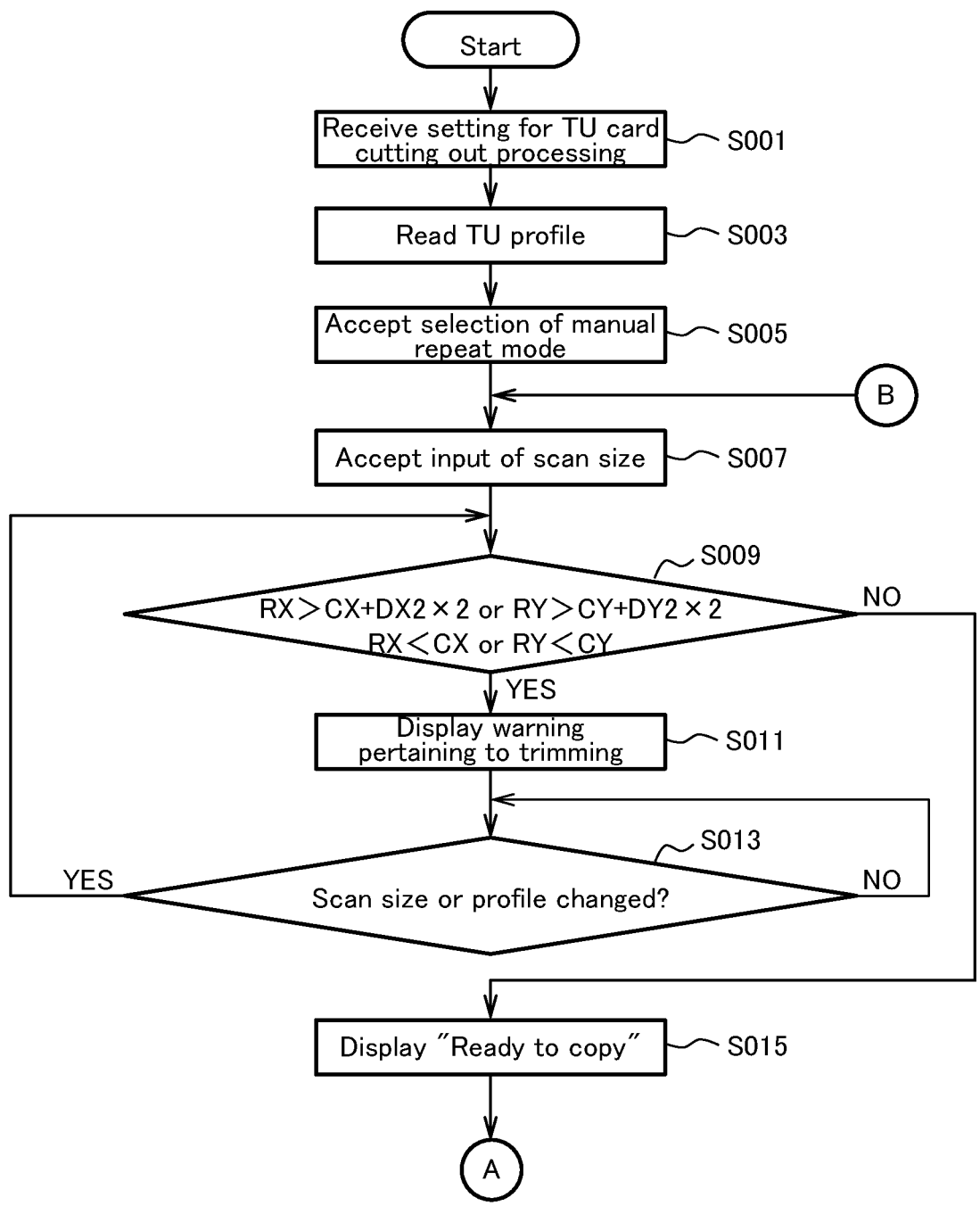

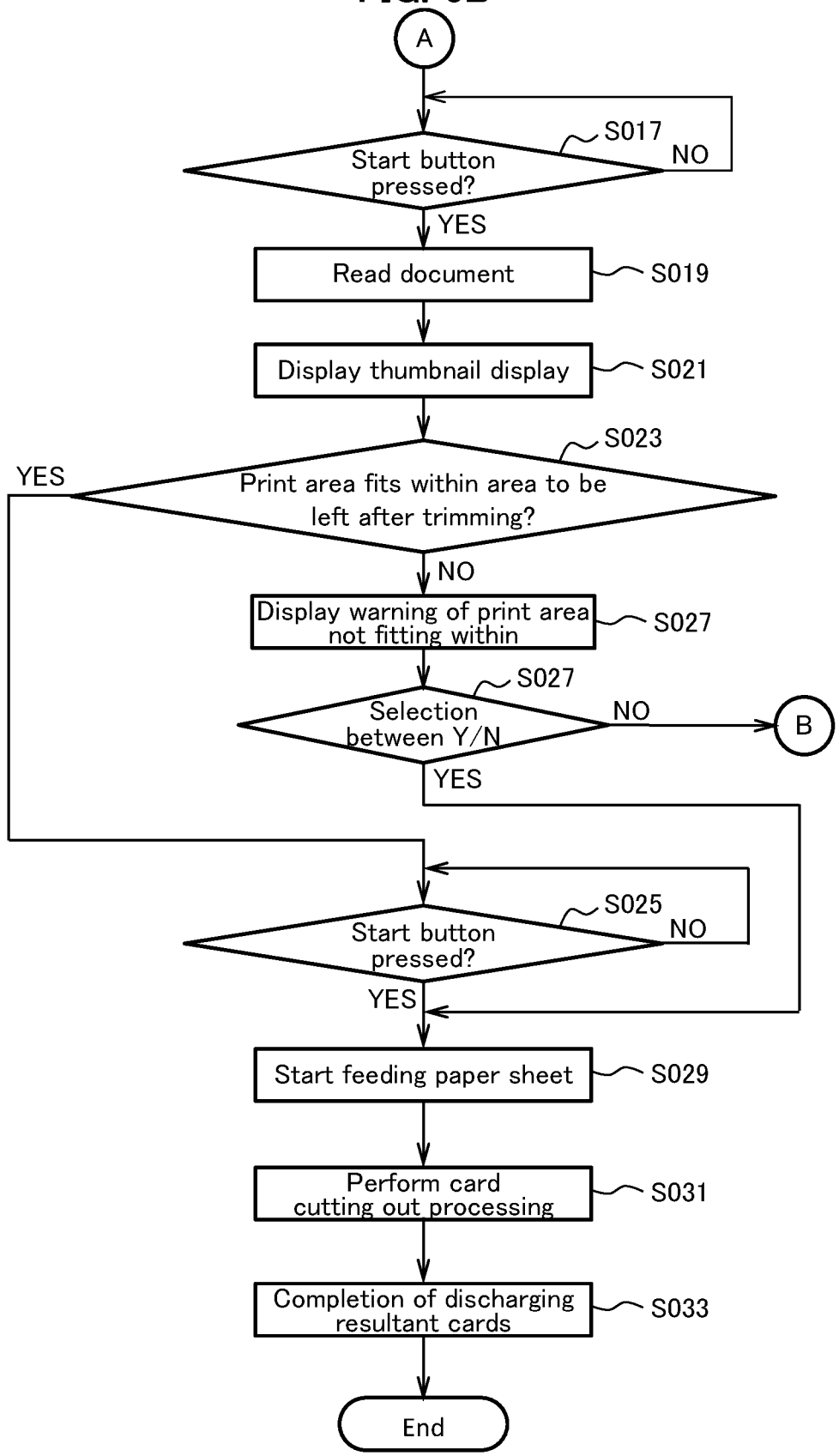

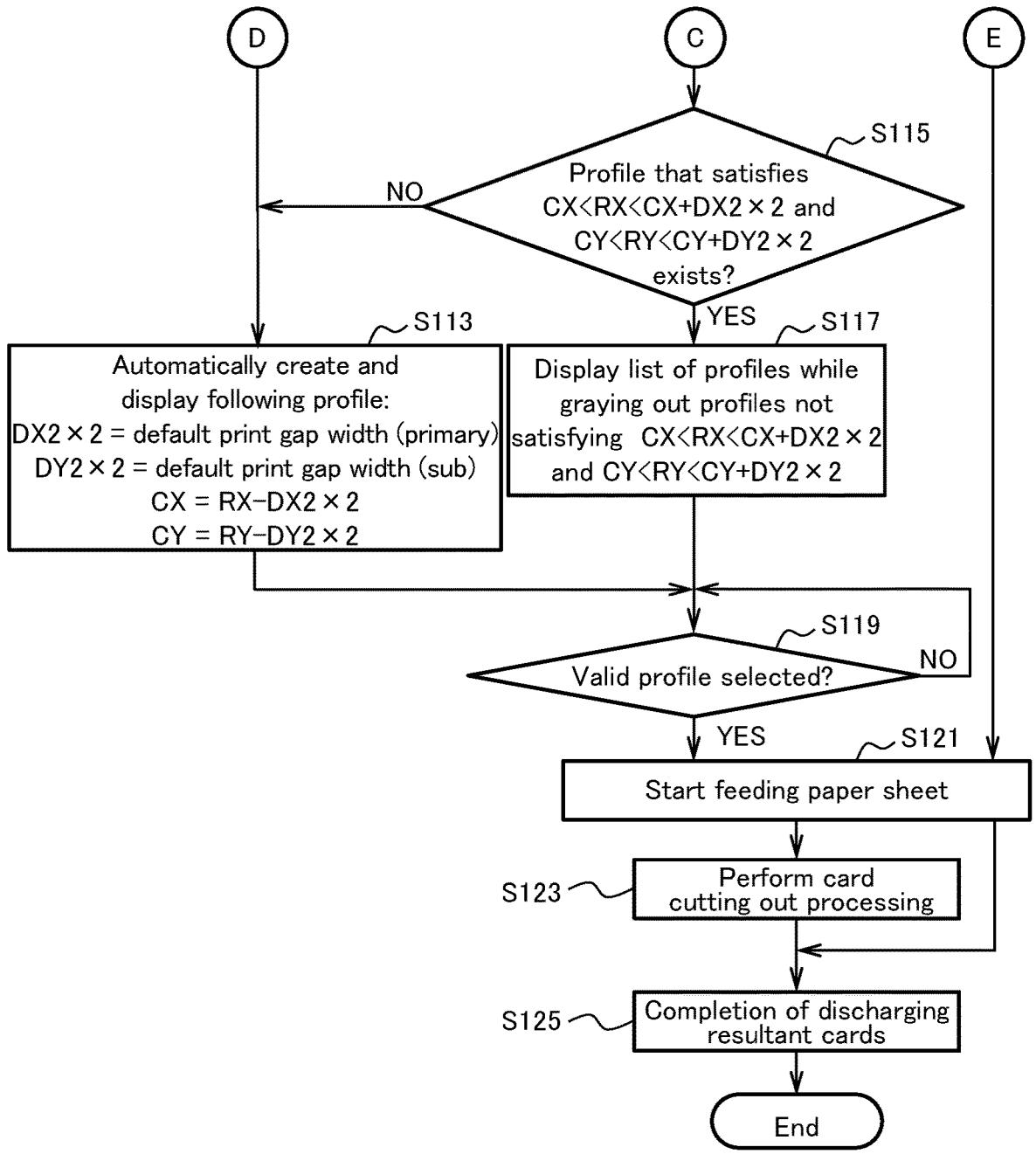

| No. | Card cutting out profile name | Primary scanning direction size | Primary scanning direction print gap intermediate size | Sub-scanning direction size | Sub-scanning direction print gap intermediate size |
|---|---|---|---|---|---|
| 1 | Business card UD | 80 | 86 | 48 | 53 |
| 2 | KM Logo | 80 | 84 | 48 | 53 |
| 3 | Phone memorandum | 80 | 86 | 48 | 49 |
| 4 | KM Logo (characters only) | 120 | 126 | 48 | 53 |
| 5 | Business card SZ | 80 | 86 | 100 | 105 |
| 6 | Flier | 40 | 46 | 48 | 53 |
| 7 | Business card TN | 80 | 86 | 30 | 35 |
| 8 | Seal | 75 | 87 | 43 | 55 |
| 9 | Label | 120 | 126 | 100 | 105 |
| 10 | Operation memorandum | 30 | 32 | 20 | 21 |

FIG. 12

| No. | Card cutting out profile name | Primary scanning direction size | Primary scanning direction print gap intermediate size | Sub-scanning direction size | Sub-scanning direction print gap intermediate size | Number of reproductions to be obtained |
|---|---|---|---|---|---|---|
| 1 | Business card UD | 80 | 86 | 48 | 53 | 15 |
| 2 | KM Logo | 80 | 84 | 48 | 53 | 15 |
| 3 | Phone memorandum | 80 | 86 | 48 | 49 | 15 |
| 4 | KM Logo (characters only) | 120 | 126 | 48 | 53 | 10 |
| 5 | Business card SZ | 80 | 86 | 100 | 105 | 6 |
| 6 | Flier | 40 | 46 | 48 | 53 | 25 |
| 7 | Business card TN | 80 | 86 | 30 | 35 | 21 |
| 8 | Seal | 75 | 87 | 43 | 55 | 12 |
| 9 | Label | 120 | 126 | 100 | 105 | 4 |
| 10 | Operation memorandum | 30 | 32 | 20 | 21 | 104 |

182

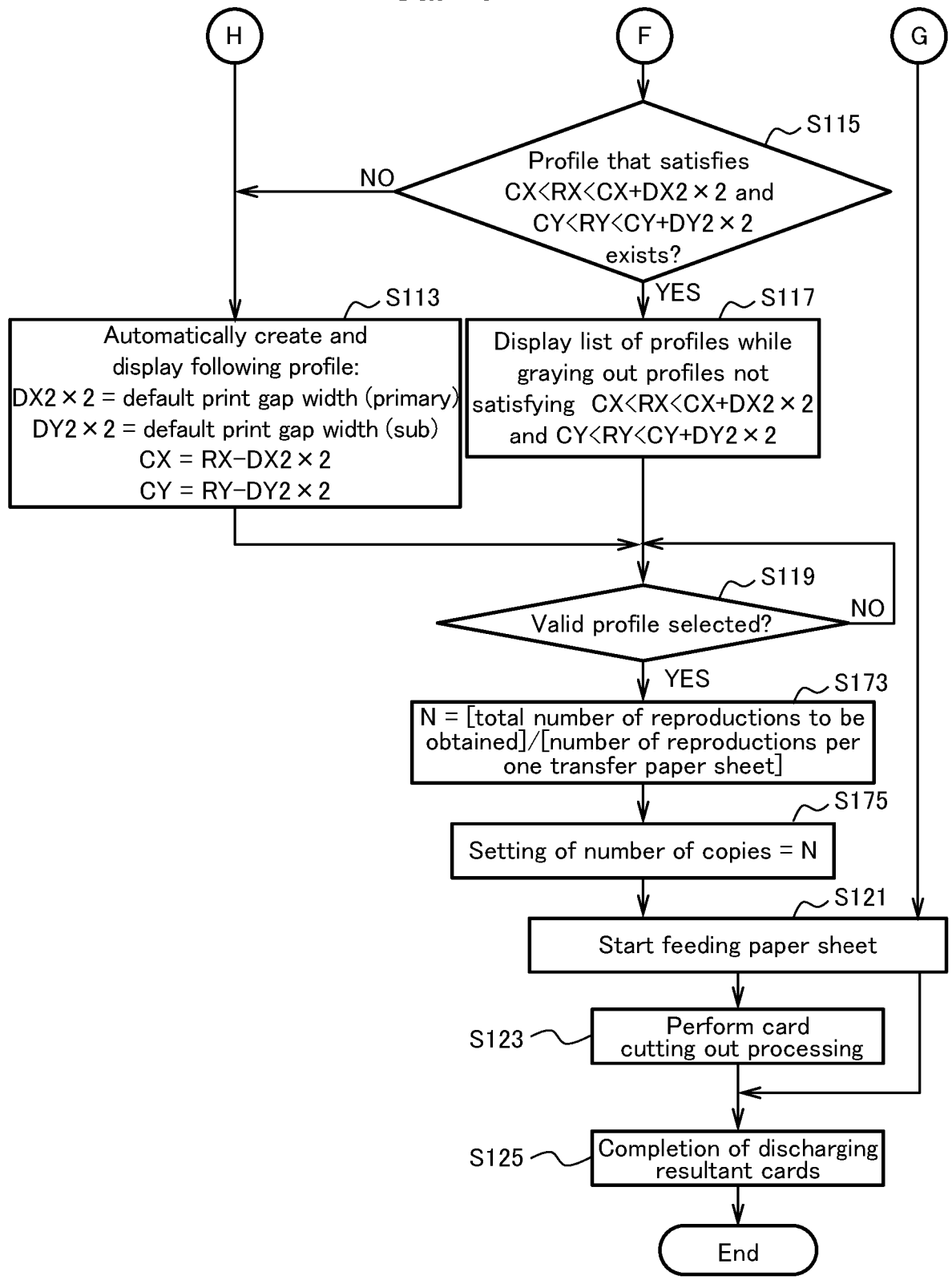

FIG. 14

| No. | Card cutting out profile name | Primary scanning direction size | Primary scanning direction print gap intermediate size | Sub-scanning direction size | Sub-scanning direction print gap intermediate size | Number of reproductions to be obtained |
|---|---|---|---|---|---|---|
| 1 | Business card UD | 80 | 86 | 48 | 53 | 15 |
| 2 | KM Logo | 80 | 84 | 48 | 53 | 15 |
| 3 | Phone memorandum | 80 | 86 | 48 | 49 | 15 |
| 4 | KM Logo (characters only) | 120 | 126 | 48 | 53 | 10 |
| 5 | Business card SZ | 80 | 86 | 100 | 105 | 6 |
| 6 | Flier | 40 | 46 | 48 | 53 | 25 |
| 7 | Business card TN | 80 | 86 | 30 | 35 | 21 |
| 8 | Seal | 75 | 87 | 43 | 55 | 12 |
| 9 | Label | 120 | 126 | 100 | 105 | 4 |
| 10 | Operation memorandum | 30 | 32 | 20 | 21 | 104 |

183

IMAGE FORMING SYSTEM AND METHOD FOR DETERMINING SETTING OF IMAGE FORMING SYSTEM

CROSS-REFERENCE TO RELATED APPLICATIONS

The entire disclosure of Japanese patent Application No. 2021-078753, filed on May 6, 2021, is incorporated herein by reference in its entirety.

BACKGROUND

Technological Field

The present invention relates to an image forming system and a method for determining setting of the image forming system.

Description of the Related Art

Conventionally, printers that performs multi-image imposition on one sheet of recording medium. For example, a plurality of scan images are recorded onto the one sheet of recording medium according to the print size and the plurality of scan images recorded onto the one sheet of recording medium are cut out to produce printed reproductions of the plurality of scan images (see Japanese Patent Publication No. 2006-137528, hereinafter referred to as Patent Literature 1).

The abstract of Patent Literature 1 discloses a printer including: a conveyor for conveying a recording medium on which multi-image imposition has been performed, a cutting section having two cutter, each cutter for cutting the recording medium in a conveying direction into a predetermined size in a width direction orthogonal to the conveying direction, the two cutter being capable of adjusting a distance between the two cutter in the forward direction; and a position adjuster for matching a cutting center, which is a central position in the width direction of cutting lines of the two cutter, and an image center, which is a central position in the width direction of at least one image recorded onto the recording medium.

SUMMARY

The conventional image forming system performs imposition without providing any trimming area (also called print gap area) to the recording medium and thus occasionally fails to cut out a plurality of printed scan images with a desired business card size.

In addition, conventional image forming systems generally requires making a setting of the completion size after trimming the recording medium while providing a trimming area (print gap area) in a trimmer profile of a trimming device and making a setting to an image forming apparatus to set an image size obtained by providing a print gap area to the scan images to be cut out. In other words, the conventional image forming systems generally requires setting similar values for two settings, i.e., to requires making a setting of a trimming device of a post-processing apparatus and making a setting of an image forming apparatus.

As a result, the conventional image forming systems generally requires time and effort to make a setting of the trimming device and to make a setting of the image forming apparatus.

In view of the above-described situation, an object of the present invention is to provide an image forming system and a method for determining settings of the image forming system which makes it possible to use the trimming device of the post-processing apparatus in combination with an image forming apparatus in an efficient manner by coordinating the setting of the trimming device and the setting for imposition of scan image(s) by the image forming apparatus.

To achieve the above-mentioned object, an aspect of the present invention is an image forming system in which an image forming apparatus is connected to a post-processing apparatus having a function of trimming, the image forming system including: a repeat setting part that determines either: a setting of a scan size of a scan image per one printed reproduction of the scan image, the one printed reproduction being to be laid out by imposition of the scan image; or a setting of the imposition of the scan image according to the scan size of the scan image; a trimming setting part that determines either: a setting of a card size of cards to be obtained by trimming a recording medium; or a setting of a trimming area for the cards; and a coordination part that coordinates the repeat setting part and the trimming setting part.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 6A is a flowchart (part 1) illustrating processing to be performed by the image forming apparatus of the image forming system according to the first embodiment.

FIG. 6B is a flowchart (part 2) illustrating the processing to be performed by the image forming apparatus of the image forming system according to the first embodiment.

FIG. 9B is a flowchart (part 2) illustrating the processing to be performed by the image forming apparatus of the image forming system according to the fourth embodiment.

FIG. 12 is an explanatory diagram illustrating a profile selection screen displayed on the operation panel.

FIG. 13B is a flowchart (part 2) illustrating the processing to be performed by the image forming apparatus of the image forming system according to the sixth embodiment.

FIG. 14 is an explanatory diagram illustrating a profile selection screen displayed on the operation panel.

DETAILED DESCRIPTION OF EMBODIMENTS

Hereinafter, embodiments for carrying out the present invention will be described in detail with reference to the drawings. The embodiments described below are examples for practicing the present invention and may be modified appropriately or altered depending on the configuration and the condition of a device to which the present invention is applied. The present invention is not limited to the embodiments described below. Furthermore, parts of various embodiments described later may be combined to constitute an embodiment for practicing the present invention.

Before describing the embodiments of the present invention in detail, first, a description will be given of gist of the present invention.

GIST OF PRESENT INVENTION

Problem to be Solved 1

In a comparative image forming system, when a scan image is laid out repetitively by imposition, the laid-out images are normally laid out with no gap (margin) therebetween. For this reason, when a setting for trimming is determined by a trimmer unit, the comparative image forming system fails to lay out the scan image at desired positions.

Figure 15A:
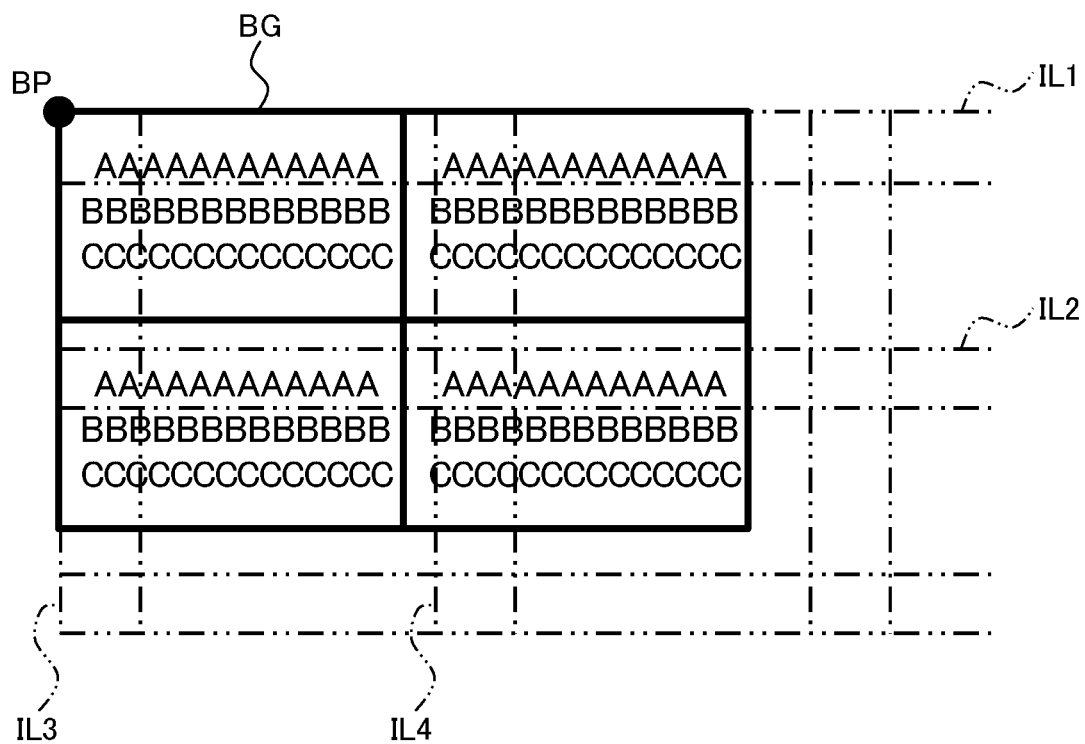
FIG. 15A is an explanatory diagram illustrating a state in which a comparative image forming system has determined a setting for trimming by a trimmer unit.

FIG. 15A is an explanatory diagram illustrating a state in which the comparative image forming system has determined a setting for trimming by a trimmer unit (trimming device).

As illustrated in FIG. 15A, using the upper left vertex of the printing area of the recording medium as the image reference position BP, the comparative image forming system lays out a scan image BG repetitively so that the laid-out scan images BG fit to the upper left and prints laid-out scan images BG. The recording medium on which laid-out scan images BG are printed is trimmed by the trimmer unit into cards having a card size, with reference to cutting lines IL1 to IL4. As laid-out scan images BG are laid out without taking into account the print gap area (i.e., trimming area), desired output result will not be printed on the cut out cards (i.e., laid-out scan images BG will not be printed on the resultant cards in a desired manner).

Problem to be Solved 2

In addition, separate from the problem in connection with the layout of scan image BG, there is a problem in that the user is required to input the same values for two settings: a card cutting out setting in a trimmer unit profile and a manual repeat setting, requiring time and effort from the user. Note that the trimmer unit profile is a profile representing conditions for trimming the recording medium into card size, and herein is simply called "profile" sometimes.

Figure 15B:
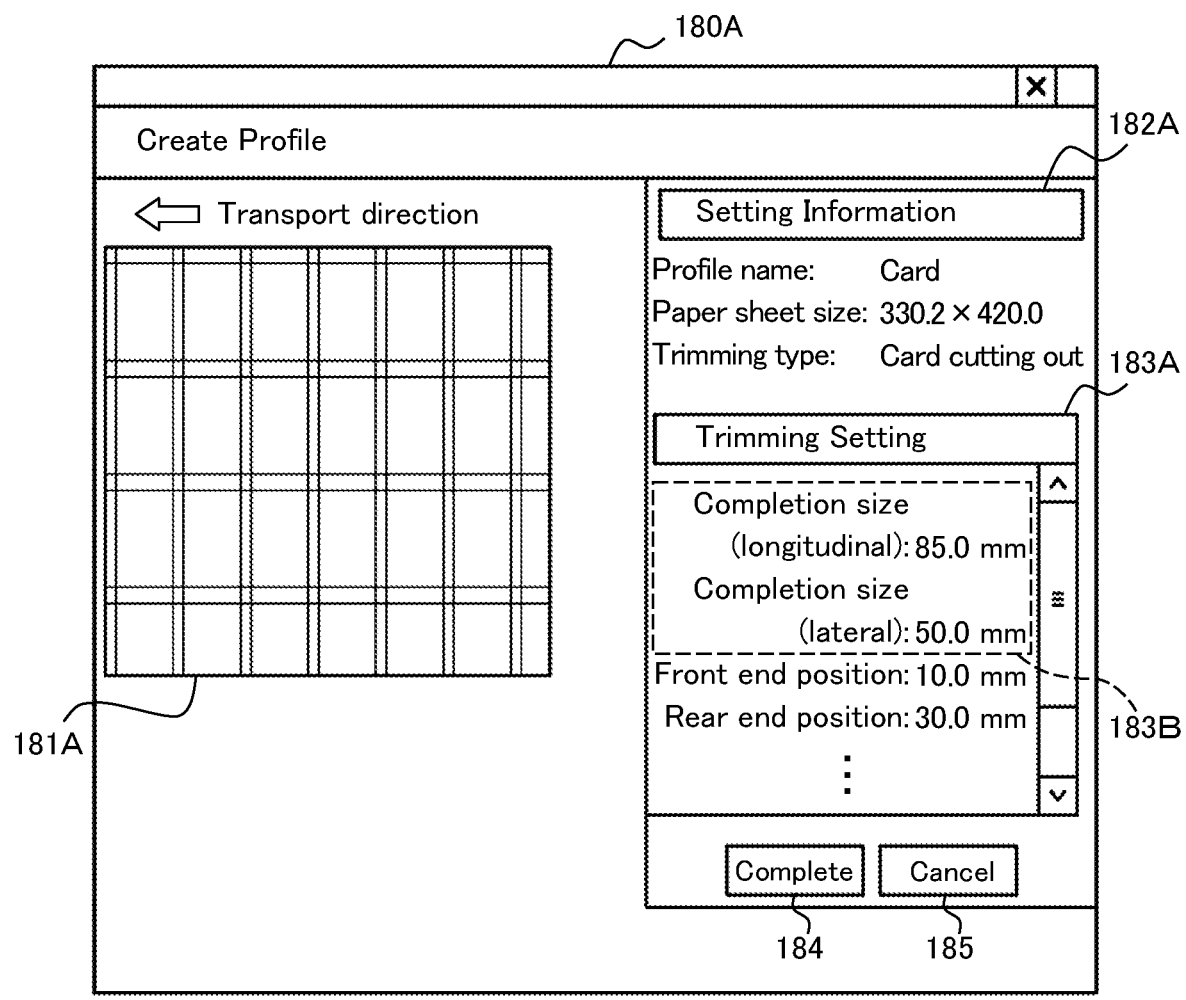
FIG. 15B is an explanatory diagram illustrating a setting screen of a trimmer profile.
Figure 15C:
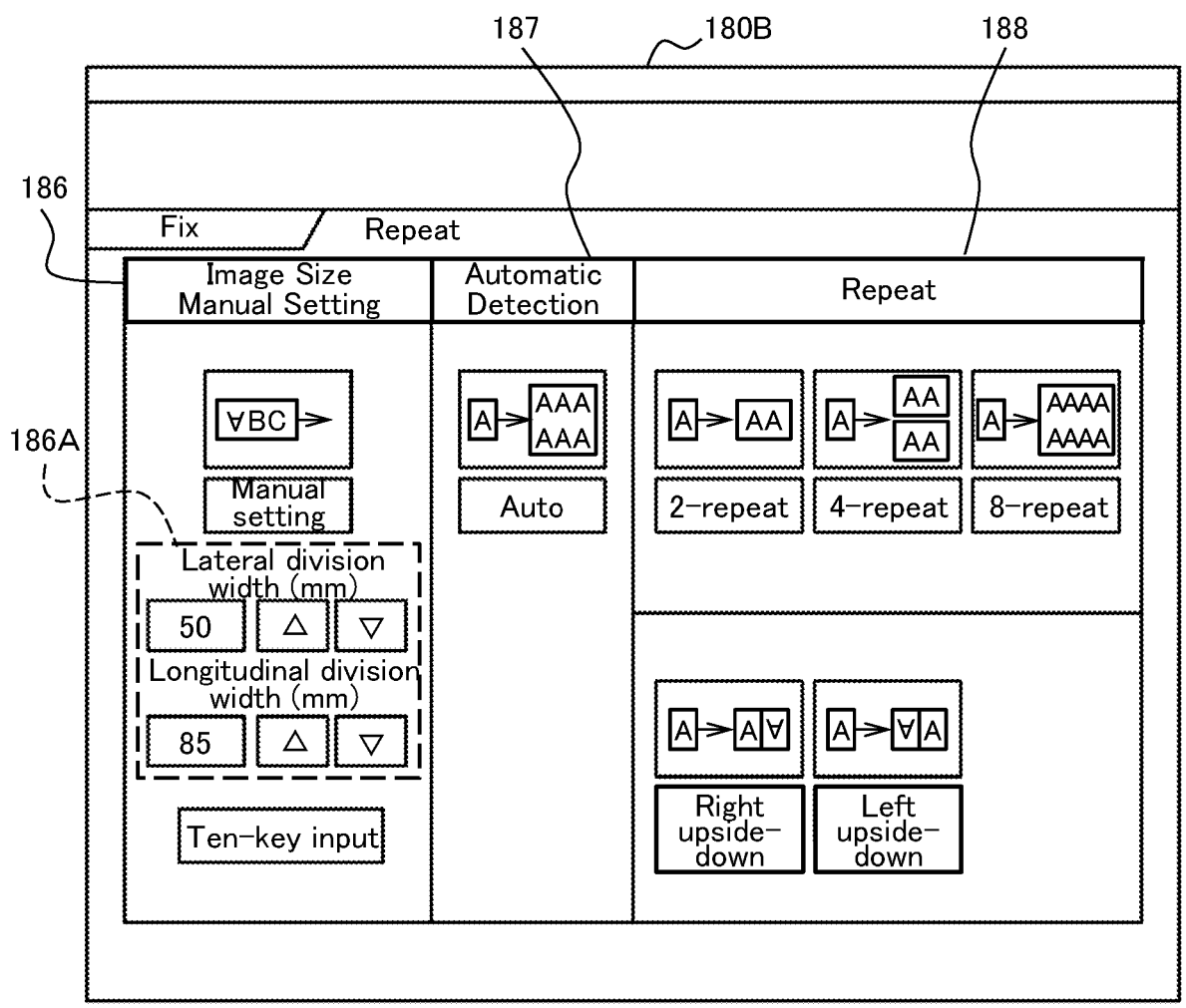
FIG. 15C is an explanatory diagram illustrating a setting screen of the UI of the image forming apparatus.

FIG. 15B illustrates a setting screen 180A of the trimmer unit profile. FIG. 15C illustrates a setting screen 180B of a user interface (UI) of the image forming apparatus.

Setting screen 180A of the trimmer unit profile, illustrated in FIG. 15B, displays settings for creating a profile. Setting screen 180A displays: a printing paper sheet trimming method 181A; setting information 182A; a trimming setting 183A; a complete button 184; and a cancel button 185.

The printing paper sheet trimming method 181A visualizes how printing paper sheet is trimmed while being transported in the transport direction.

Setting information 182A shows a profile name "Card", a paper sheet size "330.2×420.0", and a trimming type "Card cutting Out".

Trimming setting 183A includes height and width (section 183B) representing the completion size, in addition to numerical values necessary for settings for trimming. For example, section 183B shows that the completion size (longitudinal width) is set as 85.0 [mm] and that the completion size (lateral width) is set as 50.0 [mm]. In addition, a front end position is set as 10.0 mm, and a rear end position is set as 30.0 mm.

Complete button 184 is selected by the user when completing creation of the trimmer unit profile. Cancel button 185 is selected by the user to cancel the settings made in trimmer unit profile setting screen 180A.

Setting screen 180B of the UI of the image forming apparatus, illustrated in FIG. 15C, shows repeat mode options and settings of repeat modes, as item 186, item 187, and item 188.

Item 186 presents numerical values to be set manually for the image size. In section 186A, a lateral division width is set as 50 mm and a longitudinal division width is set as 85 mm. The numerical values presented in section 186A can be selected using up and down buttons or can be inputted using ten-key input.

Item 187 shows a setting for repeating the scan image automatically. Item 188 shows settings for the type and direction of the repeating. For example, it shows a "2-repeat" setting for performing imposition of one scan image to two places, a "4-repeat" setting for performing imposition of one scan image to four places, and a "8-repeat" setting for performing imposition of one scan image to eight places. The "2-repeat" setting allows selection from two additional settings: a setting such that the right side laid-out image is flipped upside down and a setting such that the left side laid-out image is flipped upside down.

As illustrated in trimming setting 183A in FIG. 15B and as illustrated in section 186A in FIG. 15C, the comparative image forming system requires determining a setting for cutting out cards in the trimmer unit profile and entering numerical values into the UI in the event of performing trimming in combination with the manual repeat mode, which reduces the operability.

In view of the above-described problem, image forming systems according to embodiments of the present disclosure coordinate determining settings of the trimming device, which is a post-processing apparatus, and determining settings of imposition of the scan image of the image forming apparatus, to determine both the settings efficiently.

First Embodiment

[Overall Configuration of Image Processing System]

Figure 1:
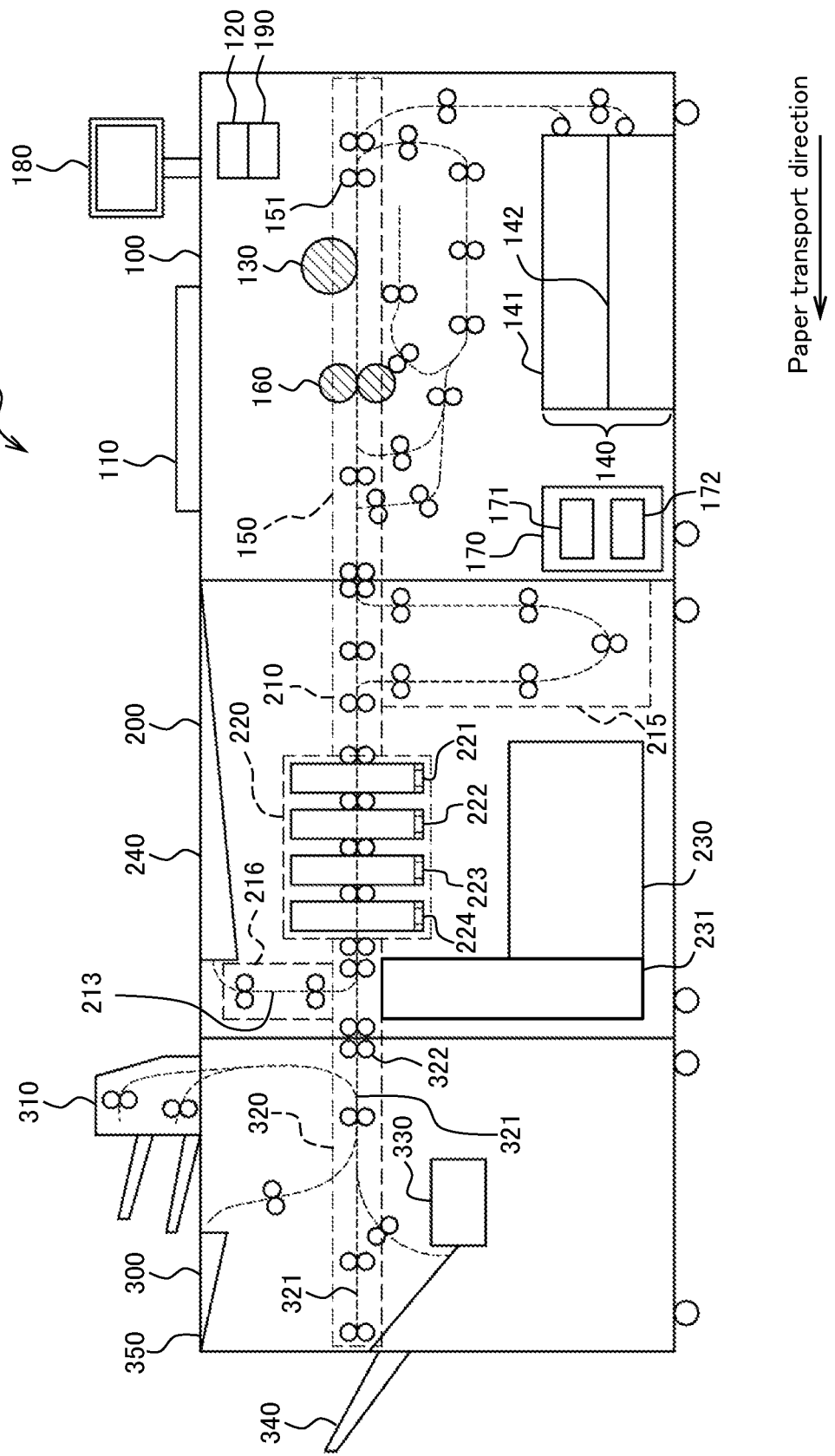
FIG. 1 is an explanatory diagram illustrating main constituent elements of an image forming system according to a first embodiment.
Figure 2:
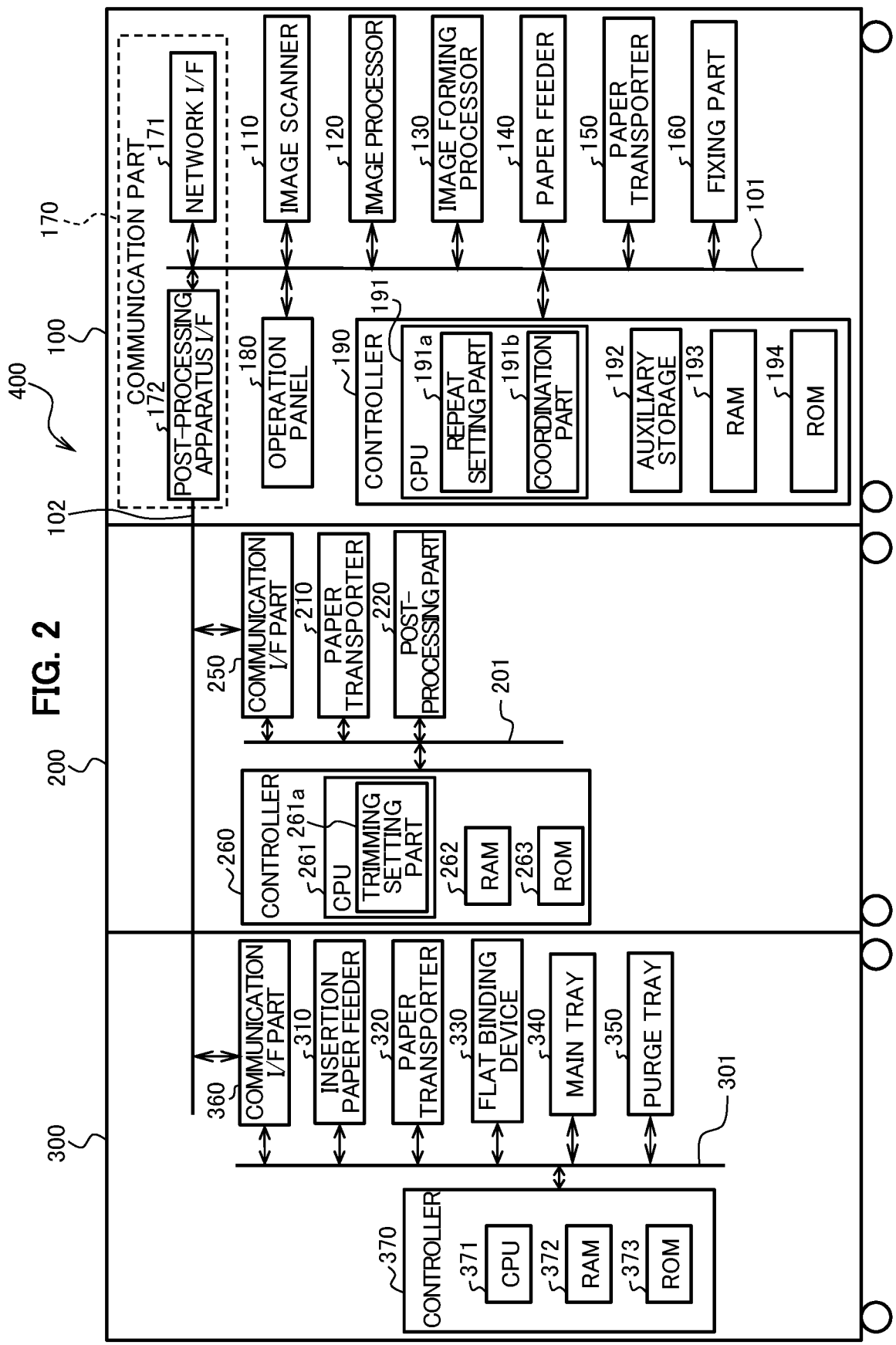
FIG. 2 is a block diagram illustrating functions of the image forming system according to the first embodiment.
Figure 3:
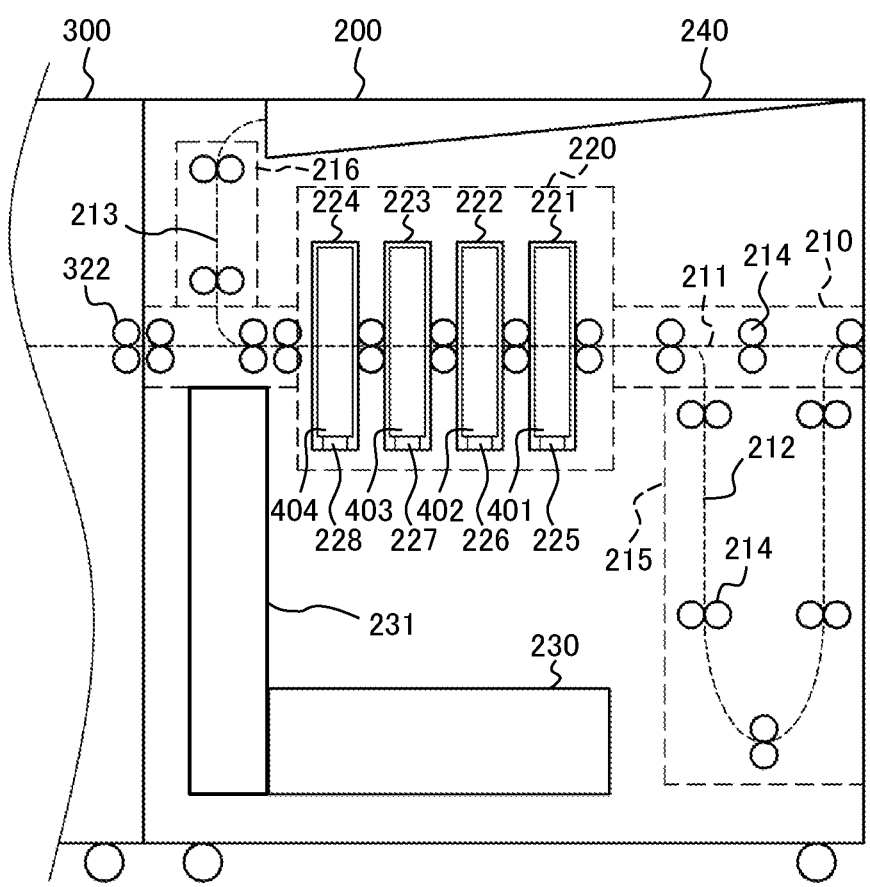
FIG. 3 is an explanatory diagram illustrating the configuration of a first post-processing apparatus of the image forming system according to a first embodiment.

FIG. 1 is an explanatory diagram illustrating main constituent elements of an image forming system 400 according to a first embodiment. FIG. 2 is a block diagram illustrating functions of image forming system 400 according to the first embodiment. FIG. 3 is an explanatory diagram illustrating the configuration of a first post-processing apparatus 200 of image forming system 400 according to the first embodiment.

Note that, in FIGS. 1 to 3, the same constituent elements of image forming system 400 according to the first embodiment are denoted by the same reference numerals and duplicated description will be omitted as appropriate.

Image forming system 400 according to the first embodiment includes an image forming apparatus 100, a first post-processing apparatus 200, and a second post-processing apparatus 300. The embodiment constructs image forming system 400 by connecting first post-processing apparatus 200 having a trimming function and second post-processing apparatus 300 to image forming apparatus 100.

Image forming apparatus 100 includes an image scanner 110, an image processor 120, an image forming processor 130, a paper feeder 140, a paper transporter 150, a fixing part 160, a communication part 170, an operation panel 180, and a controller 190. Communication part 170 includes a network interface 171 and a post-processing apparatus interface 172. These constituent elements are inter-connected via an internal bus 101 illustrated in FIG. 2. Note that the word "interface" is abbreviated "I/F" in the drawings.

Image scanner 110 is configured to read the document placed on a scanning surface, through which an image is scanned, to obtain image data. Image scanner 110 is also capable of reading documents transported by an auto document feeder (ADF) to obtain image data.

Image processor 120 performs various image processing on the image data obtained by image scanner 110 to create image data for printing.

Image forming processor 130 forms an image on a printing paper sheet, which is a recording medium, on the basis of the image data for printing. Image forming processor 130 forms the image on the printing paper sheet using an image forming process according to an electrophotographic method. Note that the image forming process according to the electrophotographic method is an image forming method including process steps of electrification, exposure, develop, and transfer.

Paper feeder 140 feeds the printing paper sheet to image forming processor 130. Paper feeder 140 includes a two-tier paper sheet tray consisting of an upper tray 141 and a lower tray 142, which store pieces of paper sheets of different sizes.

Paper transporter 150 includes a transport roller pair 151 that transports a paper sheet in image forming apparatus 100. The paper sheet fed from paper feeder 140 is transported via transport roller pair 151 toward image forming processor 130. The paper sheet being transported is synchronized at transport roller pair 151 with the toner image formed on the photosensitive drum. The toner image is transferred onto the paper sheet by a transfer part, and then the paper sheet is transported to a fixing part 160.

Fixing part 160 includes a heating roller and a pressing roller, and performs heating and pressing onto the toner image formed on the printing paper sheet to fix the toner image onto the printing paper sheet.

Communication part 170 communicates at least with either first post-processing apparatus 200 or second post-processing apparatus 300. Communication part 170 includes network interface 171 and post-processing apparatus interface 172. Network interface 171 is connected via a network with, for example, a personal computer and/or a server, to receive print jobs. Post-processing apparatus interface 172 is connected to first post-processing apparatus 200 and also to second post-processing apparatus 300 to send/receive image data.

Operation panel 180 includes a touch panel display (not shown) to construct an input part and includes a display part (not shown) to construct an output part. Operation panel 180 receives inputs of various settings and instructions for processing, and displays, for example, execution status of print jobs, conditions for post processing, and error occurrence situations.

Controller 190 includes a central processing unit (CPU) 191, an auxiliary storage 192, a random access memory (RAM) 193, and a read only memory (ROM) 194.

A control program of image forming apparatus 100 is stored in ROM 194 and/or auxiliary storage 192 and is executed by CPU 191 to embody a repeat setting part 191a and a coordination part 191b.

Repeat setting part 191a determines a setting of the scan size of the scan image for one image to be laid out and/or determines a setting of imposition according to the scan size of the scan image. Repeat setting part 191a performs imposition taking into account the print gap area (trimming area) for the scan image.

Coordination part 191b coordinates repeat setting part 191a and a trimming setting part 261a. When a desired output cannot be obtained using repeat setting part 191a in combination with trimming setting part 261a, coordination part 191b notifies the user by controlling operation panel 180 to display that the scan size or the setting of imposition should be changed. When a desired output cannot be obtained using repeat setting part 191a in combination with trimming setting part 261a, coordination part 191b notifies the user by causing operation panel 180 to display that the setting of the card size of the cards to be obtained by trimming or the setting of the print gap area (trimming area) for the cards should be changed.

Auxiliary storage 192 is constituted by a large capacity storage device(s), non-limiting examples of which includes hard disk drives and non-volatile memories. Auxiliary storage 192 stores, for example, a control program and trimmer unit (TU) profiles.

RAM 193 serves, in various processing performed by CPU 191, as a work area where various programs that are read from ROM 194 and are executable by CPU 191, input and/or output data, parameters, and the like are temporarily stored.

With this configuration, image forming apparatus 100: scans an image from the document placed on image scanner 110 (the resultant image is called scan image); determines a setting of imposition and a setting of print gap area (trimming area or margin); and forms images on the printing paper sheet (recording medium). Herein, the trimming area recited in the claims means a print gap area (sometimes simply called print gap). The repeat setting part 191a determines a trimming area (print gap) for the scan image and performs imposition of the scan image in a state where the setting of the trimming area (print gap) is determined.

First post-processing apparatus 200 includes: a paper transporter 210, a post-processing part 220, a waste box 230, a card tray 231, a purge tray 240, a communication interface part 250, and a controller 260. These constituent elements are inter-connected via an internal bus 201.

Paper transporter 210 includes a long paper transporter 215 and a purge transporter 216. As illustrated in FIG. 3, paper transporter 210 includes transport paths 211, 212, and 213 and a plurality of transport roller pairs 214. Paper transporter 210 transports the printing paper sheet set to the transport paths of first post-processing apparatus 200. Specifically, paper transporter 210 transports the printing paper sheet transported from paper transporter 150 of image forming apparatus 100 to post-processing part 220 by plurality of transport roller pairs 214, and transports the printing paper sheet subjected to the post processing to second post-processing apparatus 300.

Long paper transporter 215 transports the printing paper sheet transported from paper transporter 150 of image forming apparatus 100 to post-processing part 220 while putting the printing paper sheet in order. Purge transporter 216 transports the printing paper sheet to which the post processing is applied by post-processing part 220 to purge tray 240.

Post-processing part 220 performs post processing onto the printing paper sheet with a plurality of functional units 401 to 404. Post-processing part 220 includes a plurality of slots 221 to 224, into which functional units 401 to 404 are respectively installed. Functional units 401 to 404 are each replaceable at each of slots 221 to 224 and are each installed into a predetermined one of slots 221 to 224.

As illustrated in FIG. 3, slots 221 to 224 have detection sensors 225 to 228, respectively. Detection sensors 225 to 228 respectively detect whether functional units 401 to 404 are loaded and respectively detect the types of functional units 401 to 404.

Functional units 401 to 404 may each be, for example, a cross feeding direction (CD) trimming unit, a top and bottom slitting unit, a print gap slitting unit, a creasing unit, a CD perforation unit, a feed direction (FD) perforation unit, or a business card slitting unit.

The CD trimming unit trims the paper sheet in the CD direction. The top and bottom slitting unit trims the paper sheet in the paper transport direction and may also be called FD trimming unit. The print gap slitting unit forms a slit(s) in the FD direction. The print gap slitting processing performs trimming along two parallel cutting lines to form a slit between the two cutting lines. The creasing unit forms a crease(s) in a predetermined direction (CD direction or FD direction). The CD perforation unit forms perforations in the CD direction. The FD perforation unit forms perforations in the FD direction. The business card slitting unit forms a plurality of slits in the FD direction to trim the paper sheet into parts each having a business card size. Note that these units are examples and functional units 401 to 404 are not limited to these units.

The trim scraps generated in the trimming performed by functional units 401 to 404 of post-processing part 220 free-fall into waste box 230 and are accumulated therein. The user can easily discard the trim scraps in waste box 230.

The printing paper sheet is trimmed by post-processing part 220 into cards each having the card size and the resultant cards are stored into card tray 231.

Communication interface part 250 is connected via a communication line 102 to post-processing apparatus interface 172 of image forming apparatus 100 to send/receive data related to trimming.

Controller 260 includes a CPU 261, a RAM 262, and a ROM 263.

CPU 261 executes a control program stored in ROM 263 and configured to control first post-processing apparatus 200, to embody trimming setting part 261A. Trimming setting part 261A determines the setting of the card size of the cards to be obtained by trimming the printing paper sheet and/or determines the setting of the print gap area for the cards.

RAM 262 serves, in various processing performed by CPU 261, as a work area where various programs that are read from ROM 263 and are executable by CPU 261, input and/or output data, parameters, and the like are temporarily stored. RAM 262 may store TU profiles.

With this configuration, first post-processing apparatus 200 is configured to receive a trim-related instruction from image forming apparatus 100 and to perform trimming on the fed printing paper sheet.

Second post-processing apparatus 300 includes: an insertion paper feeder 310, a paper transporter 320, a flat binding device 330, a main tray 340, a purge tray 350, a communication interface part 360, and a controller 370

Insertion paper feeder 310 includes two paper feed trays. For example, insertion sheets such as covers and chapter covers of the printed matter are loaded into the paper feed trays of the insertion paper feeder 310, and the insertion sheets are each fed at a predetermined timing.

Paper transporter 320 includes a transport path 321 and a plurality of transport roller pairs 322. Paper transporter 320 transports the printing paper sheet fed from first post-processing apparatus 200, along transport path 321. In addition, paper transporter 320 transports paper sheets fed from first post-processing apparatus 200 or from insertion paper feeder 310, along transport path 321. In addition, paper transporter 320 transports a booklet flat-bound by flat binding device 330 to main tray 340.

Flat binding device 330 includes a not-shown stacker and a not-shown stapler. In the stacker, printing paper sheets are accumulated. The stapler staples a bundle of paper sheets. With these components, flat binding device 330 staples an end of a bundle of paper sheets to create a flat-bound booklet.

Of the paper sheets transported by paper transporter 320, valid, properly printed paper sheets are discharged into main tray 340. Of the paper sheets transported by paper transporter 320, improperly printed paper sheets are discharged into purge tray 350.

Communication interface part 360 is connected via communication line 102 to post-processing apparatus interface 172 of image forming apparatus 100 to send/receive data related to trimming.

Controller 370 includes a CPU 371, a RAM 372, and a ROM 373.

CPU 371 executes a control program stored in ROM 373 and configured to control second post-processing apparatus 300, to embody various functions. RAM 372 serves, in various processing performed by CPU 371, as a work area where various programs that are read from ROM 373 and are executable by CPU 371, input and/or output data, parameters, and the like are temporarily stored.

With this configuration, second post-processing apparatus 300 is configured to receive trim-related instructions from image forming apparatus 100 and to discharge printed paper sheets into main tray 340 or purge tray 350.

Note that in the case of the embodiments according to the present invention, trimming into cards each having a business card size is to be carried out, in which case the printing paper sheet is trimmed into the cards each having the business card size (card size) by post-processing part 220 of first post-processing apparatus 200 and then the cards obtained by trimming are stored into card tray 231 of first post-processing apparatus 200. Examples of a card having a business card size includes cards having a size of 91 [mm]×55 [mm], which is called Tokyo No. 4 or Osaka No. 9 and cards having various sizes after trimming.

[Layout for Problem to be Solved 1]

Regarding the problem to be solved 1, image forming apparatus 100 of image forming system 400 is configured to perform layout by setting desired trimming positions with a center portion of the scan image as an image reference position.

Figure 4:
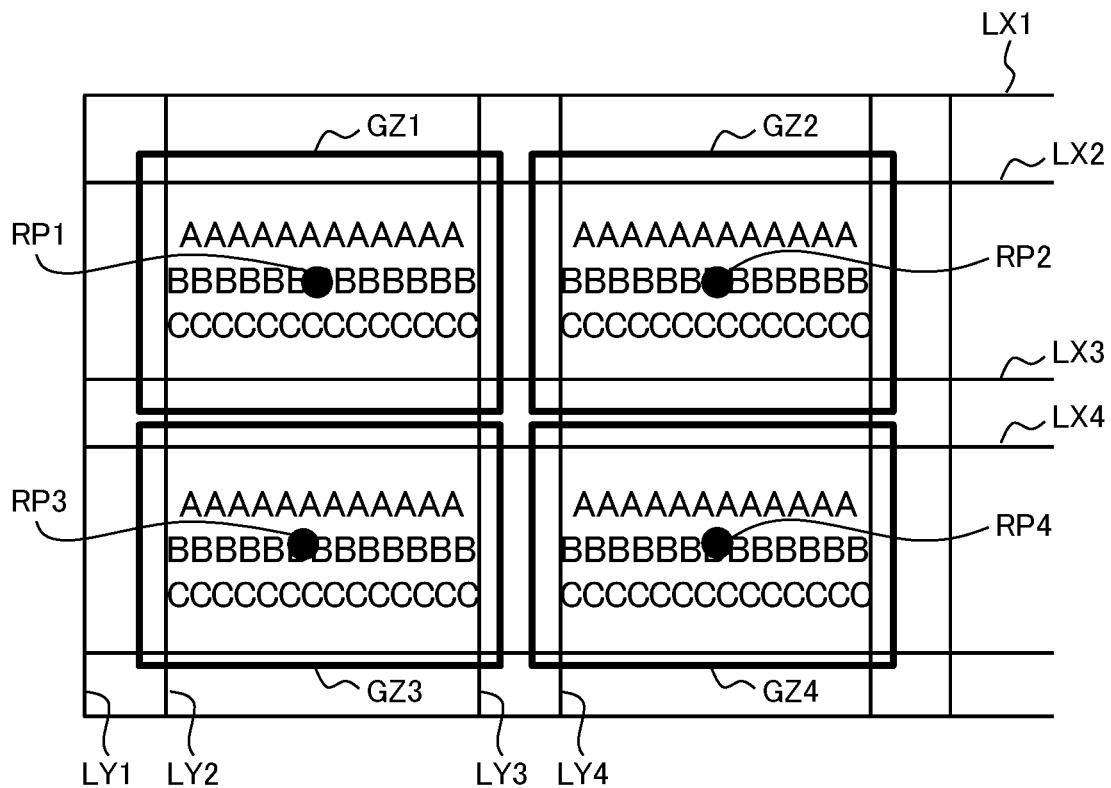
FIG. 4 is an explanatory diagram illustrating a state in which an image forming apparatus of the first embodiment lays out scan image onto printing paper sheet.

FIG. 4 is an explanatory diagram illustrating a state in which image forming apparatus 100 of the first embodiment lays out the scan image onto a printing paper sheet as images GZ1 to GZ4 (hereinafter images GZ1 to GZ4 are referred to as scan images GZ1 to GZ4 as appropriate for the sake of convenience).

As illustrated in FIG. 4, when using the image processor 120 to lay out the scan image onto the printing paper sheet with a 4-repeat mode, image forming apparatus 100 performs layout taking into account the print gap area (i.e., trimming area) of scan images GZ1 to GZ4.

Image processor 120 sets the centers of scan images GZ1 to GZ4 to image reference positions RP1 to RP4 to set the print gap area.

The print gap area consists of four areas. Specifically, the first area is the area between cutting line LX1 and cutting line LX2; the second area is the area between cutting line LX3 and cutting line LX4; the third area is the area between cutting line LY1 and cutting line LY2; and the fourth area is the area between cutting line LY3 and cutting line LY4. Cutting lines LX1 to LX4 and cutting lines LY1 to LY4 represent lines along which trimming by first post-processing apparatus 200 is to be performed.

In this manner, image forming apparatus 100 is capable of laying out scan images GZ1 to GZ4 at desired trimming positions. The layout of scan images GZ1 to GZ4, adopted in the first embodiment, is also applied to the second and further embodiments.

Second Embodiment

[Setting for Scan Image]

Regarding the problem to be solved 2, a description will be given of the processing performed by image forming system 400 having the above-described configuration, using a flowchart and with reference to FIGS. 1 to 3. Firstly, the print gap area and the cutting lines are defined for scan image GZ1 as described below.

Figure 5:
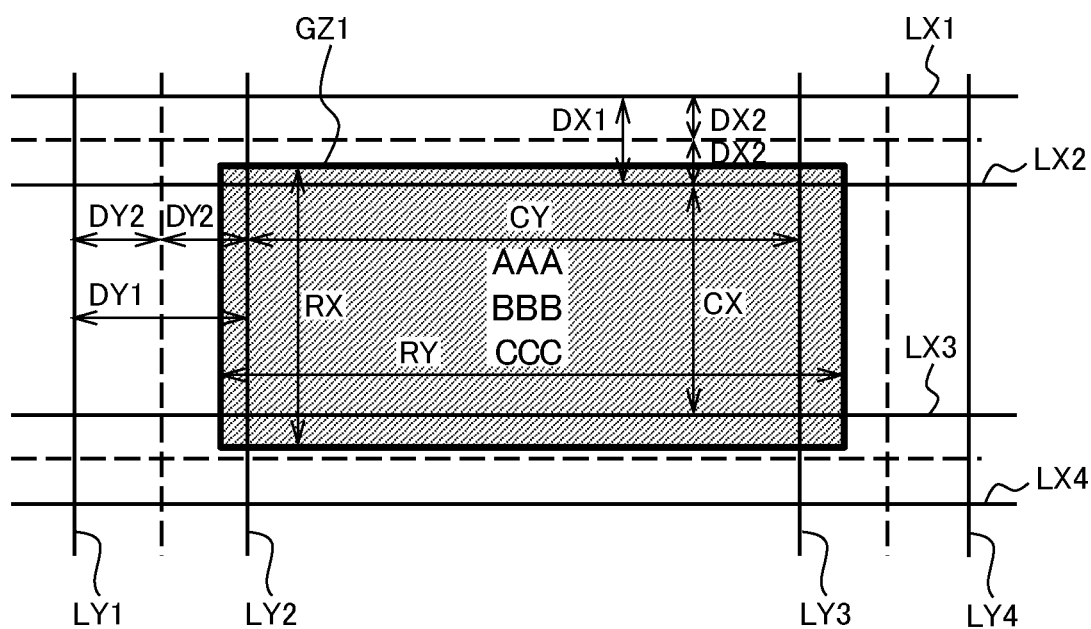
FIG. 5 illustrates definitions of areas and sizes in the event of making a repeat setting for a scan image.

FIG. 5 illustrates definitions of areas and sizes in the event of making a repeat setting for scan image GZ1. Note that, like the first embodiment, cutting lines LX1 to LX4 and cutting lines LY1 to LY4 represent lines along which trimming is performed by first post-processing apparatus 200.

As Illustrated in FIG. 5, size RX represents the size of scan image GZ1 in the primary scanning direction. Size RY represents the size of scan image GZ1 in the sub-scanning direction.

Size CX represents the primary scanning direction size of the valid area of the card(s) to be obtained by trimming. Size CX also represents the height-direction size of the area bounded by the inner perimeter of the print gap area. Size CY represents the sub-scanning direction size of the valid area of the card(s) to be obtained by trimming. Size CY also represents the width-direction size of the area bounded by the inner perimeter of the print gap area.

Size DX1 represents the frame width of the print gap area in the primary scanning direction. Size DY1 represents the frame width of the print gap area in the sub-scanning direction. Size DX2 represents the primary scanning direction width from an intermediate line of the print gap area to a corresponding primary scanning direction end of the print gap area. Size DY2 represents the sub-scanning direction width from an intermediate line of the print gap area to a corresponding sub-scanning direction end of the print gap area. Characters (e.g. AAA, BBB, CCC) in scan image GZ1 are repeated in the repeat areas each having size RX and size RY, by scan image GZ1 being repeated.

[Processing of Image Forming System]

FIGS. 6A and 6B illustrate a flowchart illustrating processing to be performed by image forming apparatus 100 of image forming system 400 according to the first embodiment.

Firstly, in step S001, image forming apparatus 100 receives designation of a trimming setting for cards to be cut out by the trimmer unit (TU) (a setting for card cutting out processing by trimmer unit) via operation panel 180.

In step S003, CPU 191 of image forming apparatus 100 reads out the TU profile corresponding to the designated trimming setting from auxiliary storage 192. In step S005, image forming apparatus 100 accepts selection of a manual repeat mode for scan image via operation panel 180.

In step S007, image forming apparatus 100 accepts input of the scan size of the image to be scanned, via operation panel 180. Repeat setting part 191a determines a setting of imposition taking into account the print gap area (trimming area) for scan image GZ1, according to the scan size setting of scan image GZ1. Note that trimming setting part 261a retains the trimming setting, a setting for trimming the recording medium, included in the TU profile read out in step S003. Here, the trimming setting for trimming the recording medium means a combination of size CX and size DX2 and a combination of size CY and size DY2.

Coordination part 191b of image forming apparatus 100 determines whether either primary scanning direction scan size RX or sub-scanning direction scan size RY of scan image GZ1 exceeds the distance between the corresponding opposed intermediate lines of the print gap area. For example, in step S009, coordination part 191b determines whether size RX defined as illustrated in FIG. 5 is greater than the sum of size Cx and size DX2×2 and determines whether size RY defined as illustrated in FIG. 5 is greater than the sum of size CY and size DY2×2.

Figure 7A:
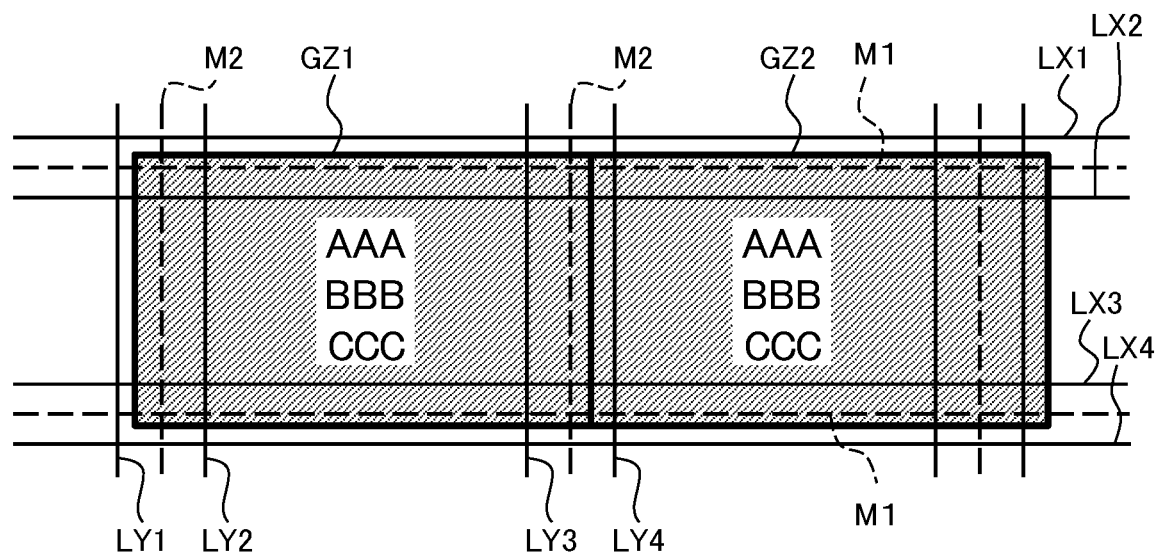
FIG. 7A is an explanatory diagram illustrating a case where both the primary scanning direction scan size and the sub-scanning direction scan size of the scan image exceed the dimension from an intermediate line of one side of the print gap area to an intermediate line of the other side of the print gap area.

FIG. 7A illustrates a case where the primary scanning direction scan size RX of scan image GZ1 exceeds the distance between the opposed intermediate lines M1 of the print gap area and sub-scanning direction scan size RY of scan image GZ1 exceeds the distance between the opposed intermediate lines M2 of the print gap area.

In the case illustrated in FIG. 7A, sub-scanning direction scan size RY of scan image GZ1 exceeds CY+DY2×2, which is the distance from the intermediate line M2 on the left side of the print gap area to the intermediate line M2 on the right side of the print gap area. Due to this, scan image GZ2, repeated on the right side, is laid out at a position which is offset to the right than the desired position. The image printed on the card obtained by trimming the printed paper sheet on which this scan image GZ2 is printed shifts to the right than the desired position. That is, trimming cannot be properly performed.

Coordination part 191b of image forming apparatus 100 also determines whether either primary scanning direction scan size RX or sub-scanning direction scan size RY of scan image GZ1 fits within the area bounded by the inner perimeter of the print gap area. For example, in step S009, coordination part 191b determines whether size RX defined as illustrated in FIG. 5 is less than height direction size CX of the area bounded by the inner perimeter of the print gap area or size RY defined as illustrated in FIG. 5 is less than width direction size CY of the area bounded by the inner perimeter of the print gap area.

Figure 7B:
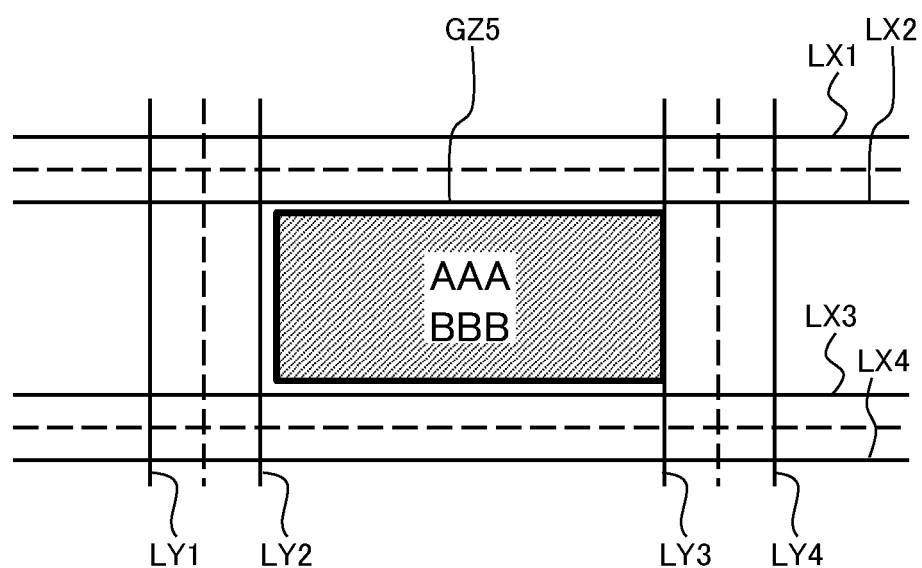
FIG. 7B is an explanatory diagram illustrating a case where both the primary scanning direction scan size and the sub-scanning direction scan size of the scan image each fit within the area bounded by the inner perimeter of the print gap area.

FIG. 7B illustrates a case where both primary scanning direction scan size RX and sub-scanning direction scan size RY of scan image GZ5 fit within the area bounded by the inner perimeter of the print gap area. (Here, scan image GZ5 is an image laid-out by imposition of the scan image.)

As illustrated in FIG. 7B, scan image GZ5 fits within the area bounded by the inner perimeter of the print gap area (fits within the area between cutting line LX2 and cutting line LX3 and between cutting line LY2 and cutting line LY3). Therefore, end portions of the card obtained by trimming are not properly printed. That means, post-processing part 220 fails to properly trim the printed paper sheet on which scan image GZ5 is printed.

When either primary scanning direction scan size RX or sub-scanning direction scan size RY of scan image GZ1 exceeds the distance between the corresponding opposed intermediate lines of the print gap area or when either primary scanning direction scan size RX or sub-scanning direction scan size RY of scan image GZ1 fits within the area bounded by the inner perimeter of the print gap area (YES at Step S009), coordination part 191b of image forming apparatus 100 displays (step S011) a warning regarding the abnormal condition for trimming. Specifically, as a desired output would not be obtained using repeat setting part 191a in combination with trimming setting part 261a, coordination part 191b notifies that the imposition setting, the setting of the card size of the cards to be obtained by trimming, or the setting of the print gap area for the cards should be changed.

For example, coordination part 191b causes operation panel 180 to display a message like "Cards will not be properly obtained by performing trimming with the current image size setting. Please change the card cutting out setting or image size setting".

Coordination part 191b awaits a change in the scan size setting or the TU profile (NO at step S013), and upon detection of a change in the scan size setting or the TU profile (YES at step S013), returns back to step S009 to perform the determination again.

On the other hand, when both primary scanning direction scan size RX and sub-scanning direction scan size RY of scan image GZ1 do not exceed the distance between the corresponding opposed intermediate lines of the print gap area and both primary scanning direction scan size RX and the sub-scanning direction scan size RY of scan image GZ1 do not fit within the area bounded by the inner perimeter of the print gap area (NO at Step S009), coordination part 191b proceeds to step S015.

In step S015, coordination part 191b causes operation panel 180 to display a message like "Ready to copy", and proceeds to step S017. Controller 190 waits for a start button, which is to start a print job, to be pressed down (NO at step S017).

Upon detection of the start button having been pressed down (YES at step S017), controller 190 causes image scanner 110 to scan a document (step S019) and proceeds to step S021.

In step S021, controller 190 causes operation panel 180 to display a thumbnail of the scan image and proceeds to step S023. In step S023, coordination part 191b determines whether the content area to be printed fits within the area to be left after trimming.

In step S023, when the content area to be printed fits within the area to be left after trimming (YES at step S023), coordination part 191b leaves the thumbnail displayed and proceeds to step S025.

Figure 7C:
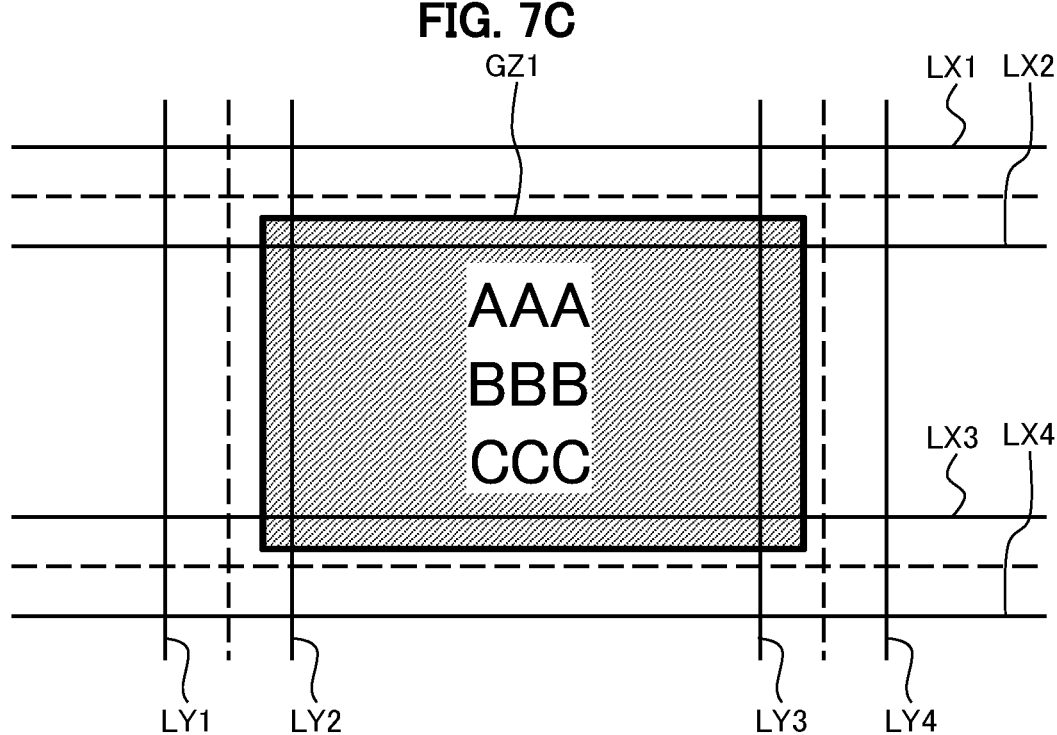
FIG. 7C is an explanatory diagram illustrating an example of a display presented by the coordination part using an operation panel to display cutting lines and the scan image to prompt a user to confirm whether the intended result will be obtained.

FIG. 7C illustrates an example of a display presented by coordination part 191b using operation panel 180 to display cutting lines LX1 to LX4, cutting lines LY1 to LY4, and scan image GZ1 to prompt the user to confirm whether the intended result will be obtained.

As illustrated in FIG. 7C, by presenting a thumbnail display on which cutting lines LX1 to LX4, cutting lines LY1 to LY4, and scan image GZ1 are superimposed, the user is prompted to confirm his/her intended result.

In step S025, controller 190 waits for the start button to be pressed down after the user has confirmed the intended result (NO at step S025). Upon detection of the start button being pressed down (YES at step S025), controller 190 proceeds to step S029.

On the other hand, when the content area to be printed fails to fit within the area to be left after trimming (NO at step S023), as the desired output would not be obtained even using repeat setting part 191a in combination with trimming setting part 261a, coordination part 191b warns (step S027) the user.

Figure 7D:
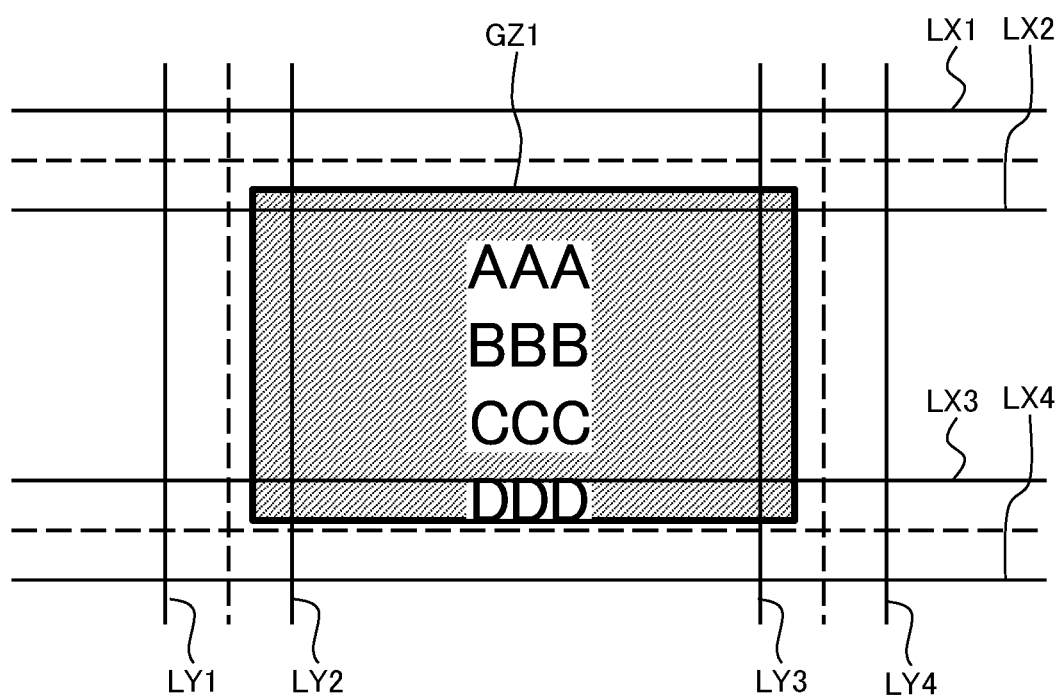
FIG. 7D is an explanatory diagram illustrating a case where the content area to be printed fits within a specified size but a part of the content area to be printed protrudes into the print gap area.

FIG. 7D illustrates a case where the content area to be printed fits within the specified size but a part ("DDD") of the content area to be printed protrudes into the print gap area.

The case illustrated in FIG. 7D can be a desired situation because the content area to be printed fits within the specified size. However, as a part ("DDD") of the content area to be printed protrudes into the print gap area, it is desirable to warn the user.

For example, coordination part 191b causes operation panel 180 to display (step S027) a message like "A part of the content area to be printed protrudes into the print gap area. This part will not be output. Do you proceed anyway?", and waits for the user to select "Yes (Y)" or "No (N)".

When the user selects "No (N)" (NO at step S027), controller 190 returns to step S007 to repeat the above described step S007 and the later steps.

When the user selects "Yes (Y)" (YES at step S027), controller 190 proceeds to step S029.

In step S029, paper feeder 140 of image forming apparatus 100 feeds printing paper sheet(s) to image forming processor 130 (step S029) to start printing the scan image.

The printed paper sheet on which the scan image is printed is subjected to card cutting out processing (step S031) by post-processing part 220 of first post-processing apparatus 200 and then the cards obtained by trimming (i.e., cards obtained by cutting the printing paper sheet) are discharged into card tray 231.

When image forming system 400 has completed discharging (step S033) the cards obtained by trimming, image forming system 400 finishes its processing.

As has been described, image forming system 400 according to the first embodiment includes repeat setting part 191a, trimming setting part 261a, and coordination part 191b that coordinates the repeat setting part 191a and trimming setting part 261a.

With this configuration, image forming system 400 according to the first embodiment coordinates the settings of first post-processing apparatus 200, which is a post-processing apparatus, and the settings of imposition of scan image of image forming apparatus 100, to determine both the settings efficiently, thereby improving the operability of multi-image imposition of the scan image and improving the efficiency of operations.

Third Embodiment

Figure 8:
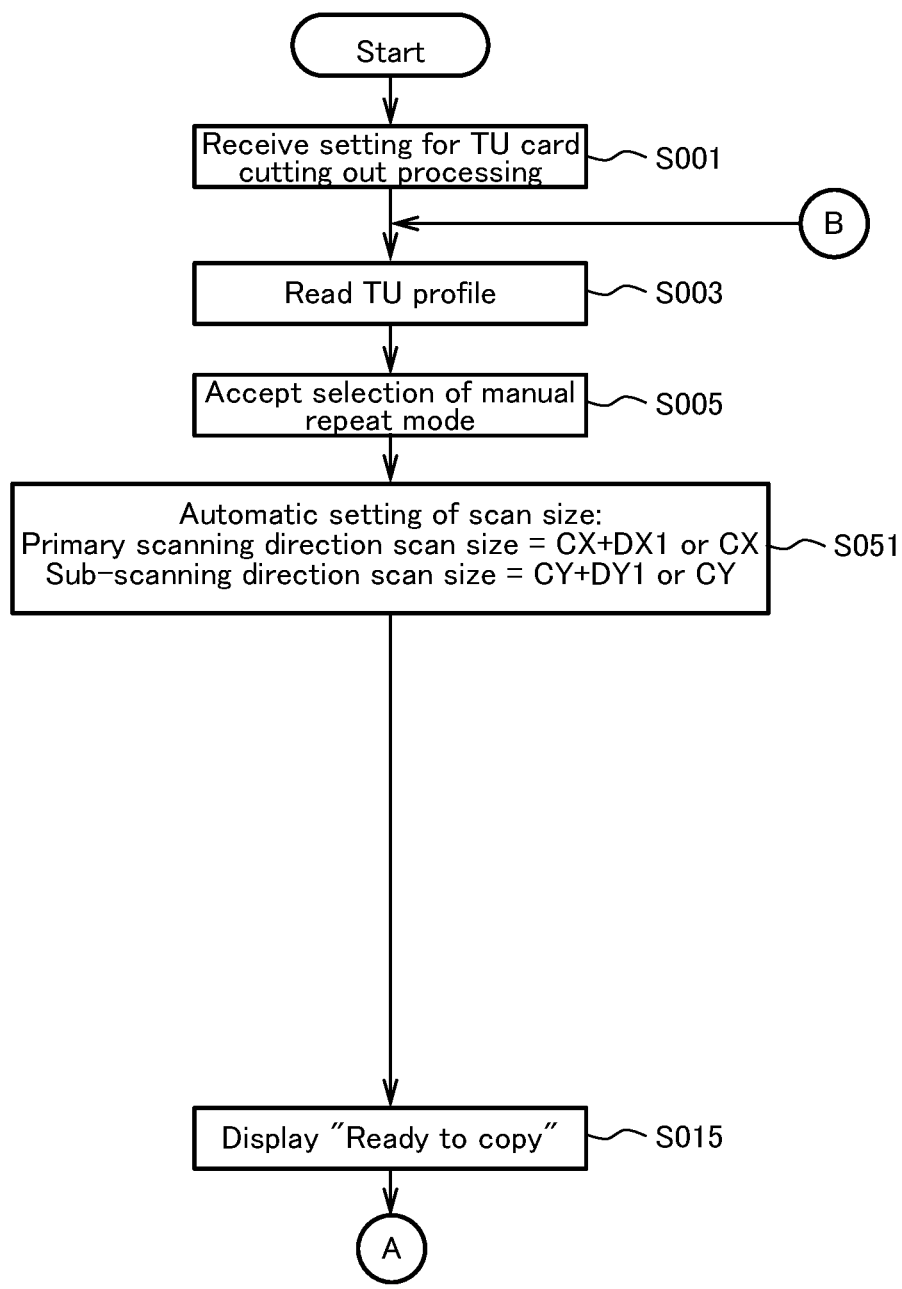
FIG. 8 is a flowchart illustrating processing to be performed by an image forming system according to a third embodiment.

The second embodiment prompts the user to change the trimming size in the TU profile when the trimming size in the TU profile is improper with respect to the scan size of the scan image. In other words, the second embodiment prioritizes the scan size of the scan image and changes the trimming size in the TU profile. In contrast, the third embodiment prioritizes the trimming size in the TU profile and changes the scan size of the scan image, FIG. 8 is a flowchart illustrating processing to be performed by image forming system 400 according to the third embodiment. Note that the same processing as one in the second embodiment will be given the same reference sign and description thereof will be omitted as appropriate.

Like the first embodiment, CPU 191 of image forming apparatus 100 receives (step S001) designation of a TU card cutting out setting and reads (step S003) the TU profile corresponding to the designated card cutting out setting.

Image forming apparatus 100 accepts (step S005) selection of a manual repeat mode for the scan image via operation panel 180, in which case the scan size of the scan image will be automatically input (step S051).

Regarding the scan size, for example, either a sum of size CX and size DX1 or size CX is automatically input as the primary scanning direction scan size, and either a sum of size CY and size DY1 or size Cy is automatically input as the sub-scanning direction scan size. Note that when the sum of size CX and size DX1 or the sum of size CY and size DY1 is automatically input, the scan size (RX, RY) is set as the result of adding the print gap widths (DX1, DY1) to the card size (CX, CY), set in the profile, of the cards to be obtained by trimming. That is, the scan size (the size for imposition of the scan image) is set to either the card size of the cards to be obtained by trimming or a card size for which the print gap area has been taken into account.

With this, coordination part 191b of image forming apparatus 100 causes operation panel 180 to display a message "Ready to copy" (step S015) and performs the same processing as the first embodiment.

When, in the second embodiment, the result of step S027 is NO, the processing flow returns to step S007, whereas, in the third embodiment, the processing flow returns to step S003.

As apparent from the above description, like the second embodiment, image forming apparatus 100 of image forming system 400 according to the third embodiment improves the operability of multi-image imposition of the scan image and improves the efficiency of operations.

Fourth Embodiment

In the cases of the second embodiment and the third embodiment, a TU card cutting out setting is selected and then the document is scanned, whereas in the fourth embodiment, the document is scanned and then a TU card cutting out setting is selected.

[Processing of Image Forming System]

A description will be given of processing performed by image forming apparatus 100 of image forming system 400 having the above-described configuration, using a flowchart and with reference to FIGS. 1 to 3.

Figure 9A:
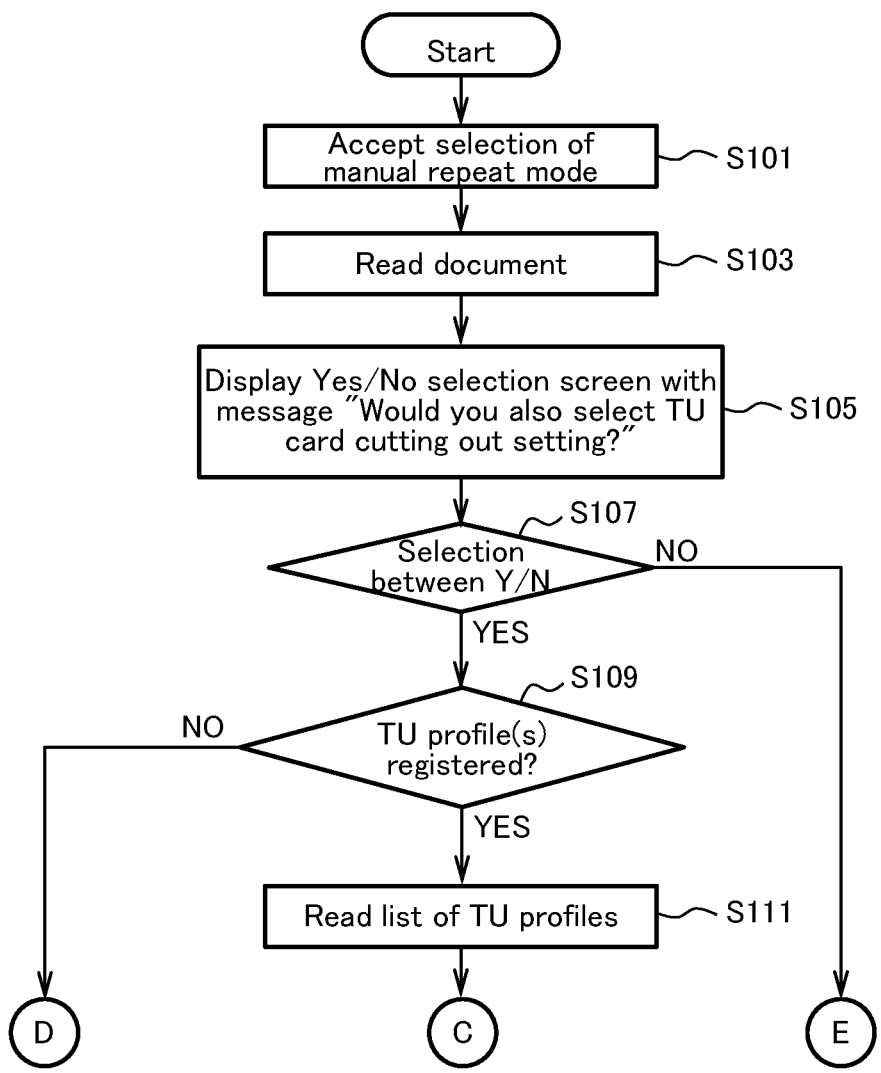
FIG. 9A is a flowchart (part 1) illustrating processing to be performed by an image forming apparatus of an image forming system according to a fourth embodiment.

FIGS. 9A and 9B illustrate a flowchart illustrating processing to be performed by image forming apparatus 100 of image forming system 400 according to the fourth embodiment.

Image forming apparatus 100 first accepts selection of a manual repeat mode via operation panel 180 and accepts input, by a user operation, of the scan size for the scan image (step S101).

Upon detection of the start button having been pressed down manually by the user, image scanner 110 performs scanning of the document (step S103).

Next, controller 190 of image forming apparatus 100 asks, on operation panel 180, whether to accept the TU card cutting out setting. For example, controller 190 causes operation panel 180 to display (step S105) a message "Would you also select TU card cutting out setting?" and waits for the user to select "Yes (Yes)" or "No (No)".

When the user selects "No (No)" (NO at step S107), controller 190 proceeds to step S121.

On the other hand, when the user selects "Yes" (YES at step S107), CPU 191 of image forming apparatus 100 determines whether any TU profile has been registered (step S109).

When one or more TU profiles has been registered (YES at step S109), CPU 191 reads a list of the registered profiles from auxiliary storage 192 (step S111), and proceeds to step S115. On the other hand, when no TU profile has been registered (NO at step S109), CPU 191 proceeds to step S113.

In step S115, coordination part 191b of image forming apparatus 100 determines whether there is a profile that satisfies a condition that size RX is greater than size CX and size RX is smaller than size CX+size DX2×2, and size RY is greater than size CY and size RY is smaller than size CY+size DY2×2 (step S115).

When there is a profile that satisfies the condition (YES at step S115), coordination part 191b grays out the profile(s) not satisfying the condition. Specifically, coordination part 191b of controller 190 causes operation panel 180 to display (step S117) the list of the registered profiles while graying out the profile(s) that fail to satisfy the condition that size RX is greater than size CX and size RX is smaller than size CX+size DX2×2, and size RY is greater than size CY and size RY is smaller than size CY+size DY2×2.

On the other hand, when there is no profile that satisfies the condition (NO at step S115), coordination part 191*b* proceeds to step S113.

In step S113, coordination part 191*b* automatically sets a default print gap width for the primary scanning direction scan size as size DX2 and automatically sets a default print gap width for the sub-scanning direction scan size as size DY2. Consequently, in step S113, size CX will be automatically assigned a value obtained by subtracting size DX2×2, which is the default primary scanning direction print gap width, from size RX, and size CY will be automatically assigned a value obtained by subtracting size DY2×2, which is the default sub-scanning direction print gap width, from size RY.

Alternatively, coordination part 191*b* may be configured to cause operation panel 180 to display a message, for example, "There is no registration of a profile with which cards are properly cut out". Please register a profile that satisfy the condition that the primary scanning direction size is less than the primary scanning direction scan size 85 mm, the primary scanning direction print gap intermediate size is greater than 85 mm, the sub-scanning direction size is less than the sub-scanning direction scan size 50 mm, and the sub-scanning direction print gap intermediate size is greater than 50 mm." to prompts the user to manually create a profile.

Herein, the term "primary scanning direction print gap intermediate size" corresponds to the distance between opposed intermediate lines M1 in the print gap area illustrated in FIG. 7A, i.e., size CX+size DX2×2; and the term "sub-scanning direction print gap intermediate size" corresponds to the distance between opposed intermediate lines M2 in the print gap area illustrated in FIG. 7A, i.e., size CY+size DY2×2.

Like this, auxiliary storage 192 may be configured to store profiles that represent conditions for trimming the printing paper sheet into cards having a card size, and trimming setting part 261*a* may be configured to, when performing imposition of the scan image onto the printing paper sheet is impossible with any of the profiles, create a profile with which performing imposition of the scan image onto the printing paper sheet is possible. Note that, these profiles, including the newly created profile, may be stored in RAM 262.

Figure 10:
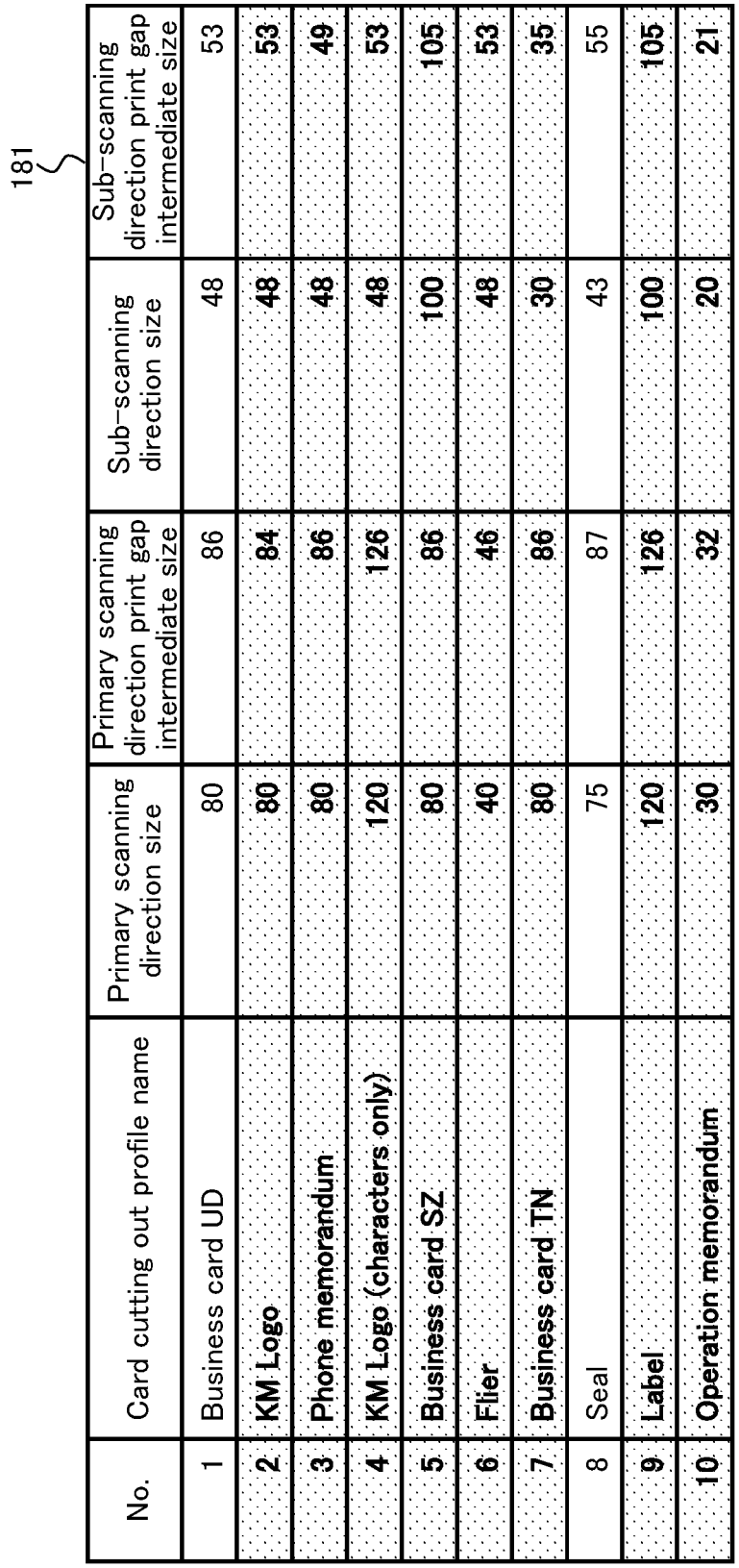
FIG. 10 is an explanatory diagram illustrating a profile selection screen displayed on the operation panel.

FIG. 10 is an explanatory diagram illustrating a profile selection screen 181 displayed on operation panel 180. As illustrated in FIG. 10, profile selection screen 181 displays columns including "No.", "Card cutting out profile name", "Primary scanning direction size", "Primary scanning direction print gap intermediate size", "Sub-scanning direction size", and "Sub-scanning direction print gap intermediate size".

For item No. 1, Card cutting out profile name is populated with "Business card UD"; Primary scanning direction size, "80"; Primary scanning direction print gap intermediate size (mm), "86"; Sub-scanning direction size (mm), "48"; and Sub-scanning direction print gap intermediate size (mm), "53". For item No. 2, Card cutting out profile name is populated with "KM Logo"; Primary scanning direction size (mm), "80"; Primary scanning direction print gap intermediate size (mm), "84"; Sub-scanning direction size (mm), "48"; and Sub-scanning direction print gap intermediate size (mm), "53". For item No. 3, Card cutting out profile name is populated with "Phone memorandum"; Primary scanning direction size (mm), "80"; Primary scanning direction print gap intermediate size (mm), "86"; Sub-scanning direction size (mm), "48"; and Sub-scanning direction print gap intermediate size (mm), "49". For item No. 4, Card cutting out profile name is populated with "KM Logo (characters only)"; Primary scanning direction size (mm), "120"; Primary scanning direction print gap intermediate size (mm), "126"; Sub-scanning direction size (mm), "48"; and Sub-scanning direction print gap intermediate size (mm), "53".

For item No. 5, Card cutting out profile name is populated with "Business card SZ"; Primary scanning direction size (mm), "80"; Primary scanning direction print gap intermediate size (mm), "86"; Sub-scanning direction size (mm), "100"; and Sub-scanning direction print gap intermediate size (mm), "105".

For item No. 6, Card cutting out profile name is populated with "Flier"; Primary scanning direction size (mm), "40"; Primary scanning direction print gap intermediate size (mm), "46"; Sub-scanning direction size (mm), "48"; and Sub-scanning direction print gap intermediate size (mm), "53".

For item No. 7, Card cutting out profile name is populated with "Business card TN"; Primary scanning direction size (mm), "80"; Primary scanning direction print gap intermediate size (mm), "86"; Sub-scanning direction size (mm), "30"; and Sub-scanning direction print gap intermediate size (mm), "35". For item No. 8, Card cutting out profile name is populated with "Seal"; Primary scanning direction size (mm), "75"; Primary scanning direction print gap intermediate size (mm), "87"; Sub-scanning direction size (mm), "43"; and Sub-scanning direction print gap intermediate size (mm), "55".

For item No. 9, Card cutting out profile name is populated with "Label"; Primary scanning direction size (mm), "120"; Primary scanning direction print gap intermediate size (mm), "126"; Sub-scanning direction size (mm), "100"; and Sub-scanning direction print gap intermediate size (mm), "105". For item No. 10, Card cutting out profile name is populated with "Operation memorandum"; Primary scanning direction size (mm), "30"; Primary scanning direction print gap intermediate size (mm), "32"; Sub-scanning direction size (mm), "20"; and Sub-scanning direction print gap intermediate size (mm), "21".

Note that Card cutting out profile name of items No. 2 to No. 7, No. 9, and No. 10 are grayed out because the condition of step S117 is not satisfied. Due to this, on profile selection screen 181, only item No. 1 "Business card UD and item No. 8 "Seal" are displayed in a selectable state.

Trimming setting part 261*a* waits for a valid profile to be selected (NO at step S119), and upon selection of item No. 1 "Business card UD" or item No. 8 "Seal" (YES at step S119), proceeds to step S121.

In step S121, paper feeder 140 of image forming apparatus 100 feeds a printing paper sheet to image forming processor 130 to cause image forming processor 130 to start printing (step S121) of the scan image.

The printed paper sheet on which the laid-out image(s) of the scan image are printed is subjected to the card cutting out processing by trimming (step S123) by post-processing part 220 of first post-processing apparatus 200 and the card(s) obtained by trimming are discharged into card tray 231.

When completing (step S125) discharging the card(s) obtained by trimming, image forming system 400 finishes the process.

As described above, image forming system 400 according to the fourth embodiment includes repeat setting part 191*a*, trimming setting part 261*a*, and coordination part 191*b* that coordinates repeat setting part 191*a* and trimming setting part 261*a*.

With this configuration, like the second embodiment and the third embodiment, image forming system 400 according to the fourth embodiment coordinates the settings of first post-processing apparatus 200, which is a post-processing apparatus, and the settings of imposition of scan image of image forming apparatus 100, to determine both the settings efficiently, thereby improving the operability of multi-image imposition of the scan image and improving the efficiency of operations.

Fifth Embodiment

Regarding the usage of the automatic repeat mode and the manual repeat mode, it is assumed that there is a desire to print, for example, 15 business cards per one printing paper sheet. The fifth embodiment sets a minimum number of reproductions to be obtained for the automatic repeat mode and the manual repeat mode of the fourth embodiment.

Specifically, in image forming system 400 according to the fifth embodiment, repeat setting part 191*a* is configured to receive a setting of minimum number of reproductions to be obtained as the number of reproductions of the scan image which are obtainable from one sheet of recording medium; coordination part 191*b* is configured to, when the desired number of reproductions of the scan image to be obtained is less than the minimum number of reproductions to be obtained, notify that the setting of the scan size or the setting of imposition should be changed; and coordination part 191*b* is configured to, when the desired number of reproductions of the scan image to be obtained is equal to or greater than the minimum number of reproductions to be obtained, notify that the setting of the card size or the setting of the print gap area of the cards should be changed.

[Processing of Image Forming System]

A description will be given of processing performed by image forming system 400 having the above-described configuration, using a flowchart and as appropriate with reference to FIGS. 1 to 3, 9A, 9B, and 10.

Figure 11A:
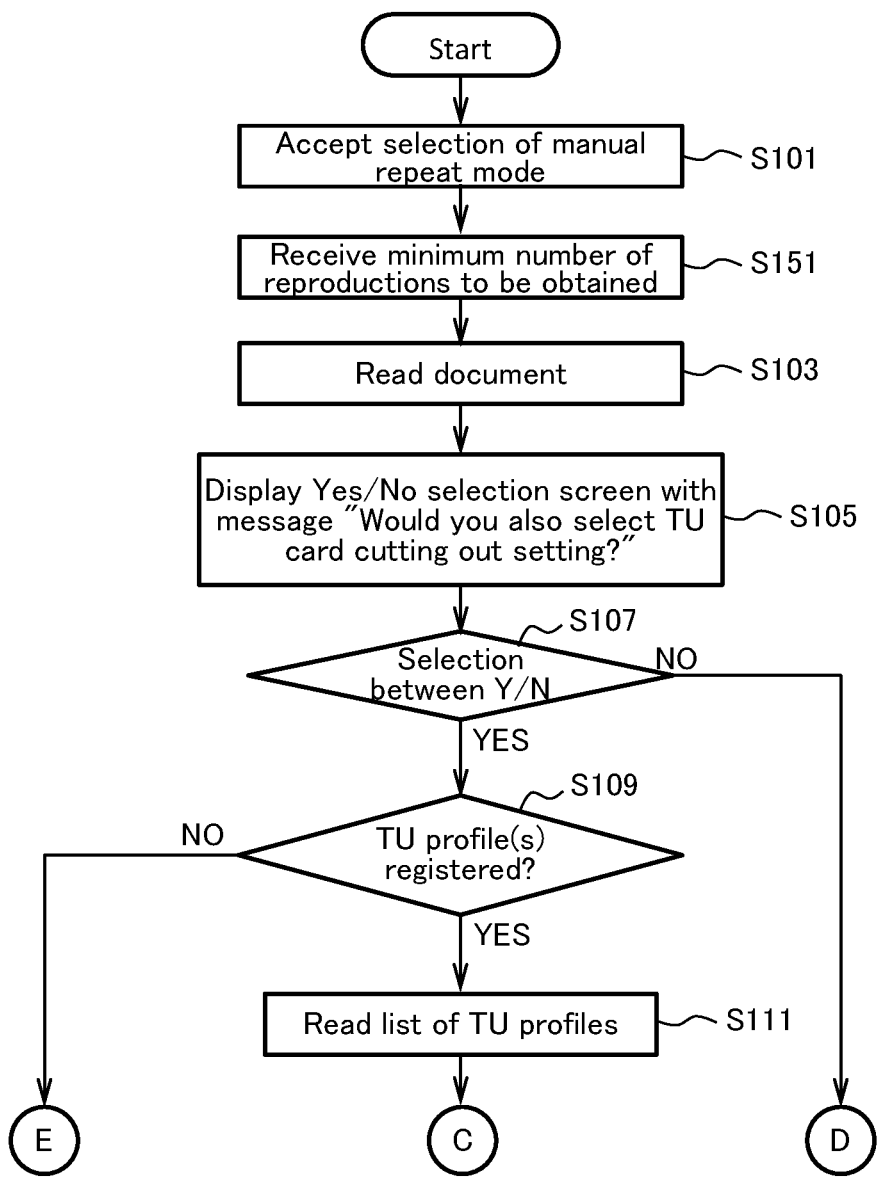
FIG. 11A is a flowchart (part 1) illustrating processing to be performed by an image forming apparatus of an image forming system according to a fifth embodiment.
Figure 11B:
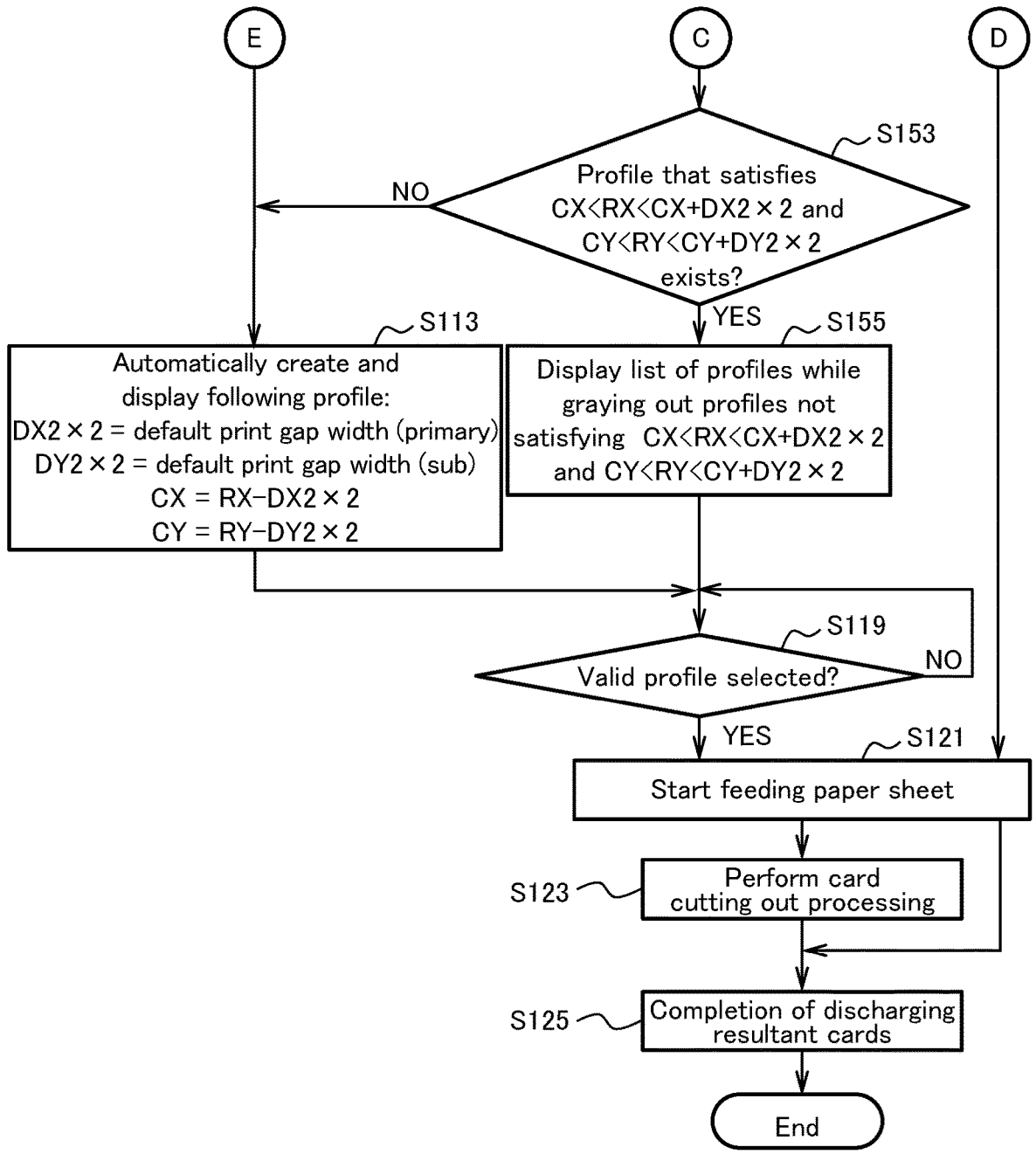
FIG. 11B is a flowchart (part 2) illustrating the processing to be performed by the image forming apparatus of the image forming system according to the fifth embodiment.

FIGS. 11A and 11B illustrate a flowchart illustrating processing to be performed by image forming apparatus 100 of image forming system 400 according to the fifth embodiment. Note that the same processing as one in FIGS. 9A and 9B will be given the same reference sign and description thereof will be omitted as appropriate.

Repeat setting part 191*a* of image forming apparatus 100 receives a setting of minimum number of reproductions to be obtained (in this case, a value of 15 is specified as the minimum number of reproductions to be obtained), via operation panel 180 (step S151). In this embodiment, the desired number of reproductions of the scan image to be obtained per one printing paper sheet (herein simply referred to as number of reproductions to be obtained) is set in advance by the repeat setting part 191*a* for each of the profiles. For example, the number of reproductions to be obtained for card cutting out profile No. 1 "Business card UD", illustrated in FIG. 10, is set as 15, as illustrated in FIG. 12.

According to this information, when CPU 191 reads the list of profiles from auxiliary storage 192 (step S111), CPU 191 grays out the profiles that fail to satisfy the condition.

FIG. 12 is an explanatory diagram illustrating a profile selection screen 182 displayed on operation panel 180. As illustrated in FIG. 12, profile selection screen 182 presents the content presented in profile selection screen 181, illustrated in FIG. 10, and a column representing the number of reproductions to be obtained per one printing paper sheet.

The column of Number of reproductions to be obtained, illustrated in FIG. 12, represents the number of reproduced sheets to be obtained per one printing paper sheet (per one sheet of recording medium), and is populated with a value of 15 for item No. 1; a value of 15 for item No. 2; a value of 15 for item No. 3; a value of 10 for item No. 4; a value of 6 for item No. 5; a value of 25 for item No. 6; a value of 21 for item No. 7; a value of 12 for item No. 8; a value of 4 for item No. 9; and a value of 104 for item No. 10.

In the case presented in FIG. 12, the number of reproductions to be obtained (number of reproduced sheets to be obtained per one printing paper sheet) for item No. 8 "Seal" is set to a value of 12, and thus item No. 8 fails to satisfy the condition regarding the minimum number of reproductions to be obtained. For this reason, CPU 191 grays out item No. 8 "Seal", which is selectable in profile selection screen 181, on profile selection screen 182.

Moreover, there can be a case in which even when the print gap width is set to a minimum, coordination part 191*b* of image forming apparatus 100 cannot satisfy the condition regarding the minimum number of reproductions to be obtained (number of reproduced sheets to be obtained per one printing paper sheet) in step S153 and step S155. In this case, coordination part 191*b* may cause operation panel 180 to prompt user to change the repeat setting of the scan image and/or change settings of the printing paper sheet.

For example, coordination part 191*b* may cause operation panel 180 to display a message that reads "Unable to create a profile that satisfies a condition that the image size is 85 mm×50 mm and the minimum number of reproductions to be obtained is 15. Please set a different image size and/or a different minimum number of reproductions to be obtained, or change the paper sheet size", to prompt the user to change the repeat setting and/or the paper sheet setting.

When the desired number of reproductions of the scan image to be obtained is greater than or equal to the minimum number of reproductions to be obtained, coordination part 191*b* may cause operation panel 180 to display a message that reads, for example, "Please check the card size setting or check the setting of the print gap area of the card" to prompt the user to change the card size setting or print gap area setting for the card.

Sixth Embodiment

There will be a desire, for example, to print 100 sheets of business card as usage of the automatic repeat function and the manual repeat function. The sixth embodiment allows setting of a total number of reproductions to be obtained (total number of reproduced sheets to be obtained) for the automatic repeat function and the manual repeat function in the fourth embodiment.

Specifically, repeat setting part 191*a* of image forming system 400 according to the sixth embodiment is configured to receive settings for the total number of reproductions of the card to be obtained, and when a profile with which desired output can be obtained is read out, calculate the number of copies of printed sheet for the card from the total number of reproductions to be obtained and the number of reproductions to be obtained from one sheet of recording medium according to the profile.

[Processing of Image Forming System]

A description will be given of the correction processing to be performed by image forming apparatus 100 as configured above, using a flowchart with reference to FIGS. 1 to 3, 9A, 9B, and 10 as appropriate.

Figure 13A:
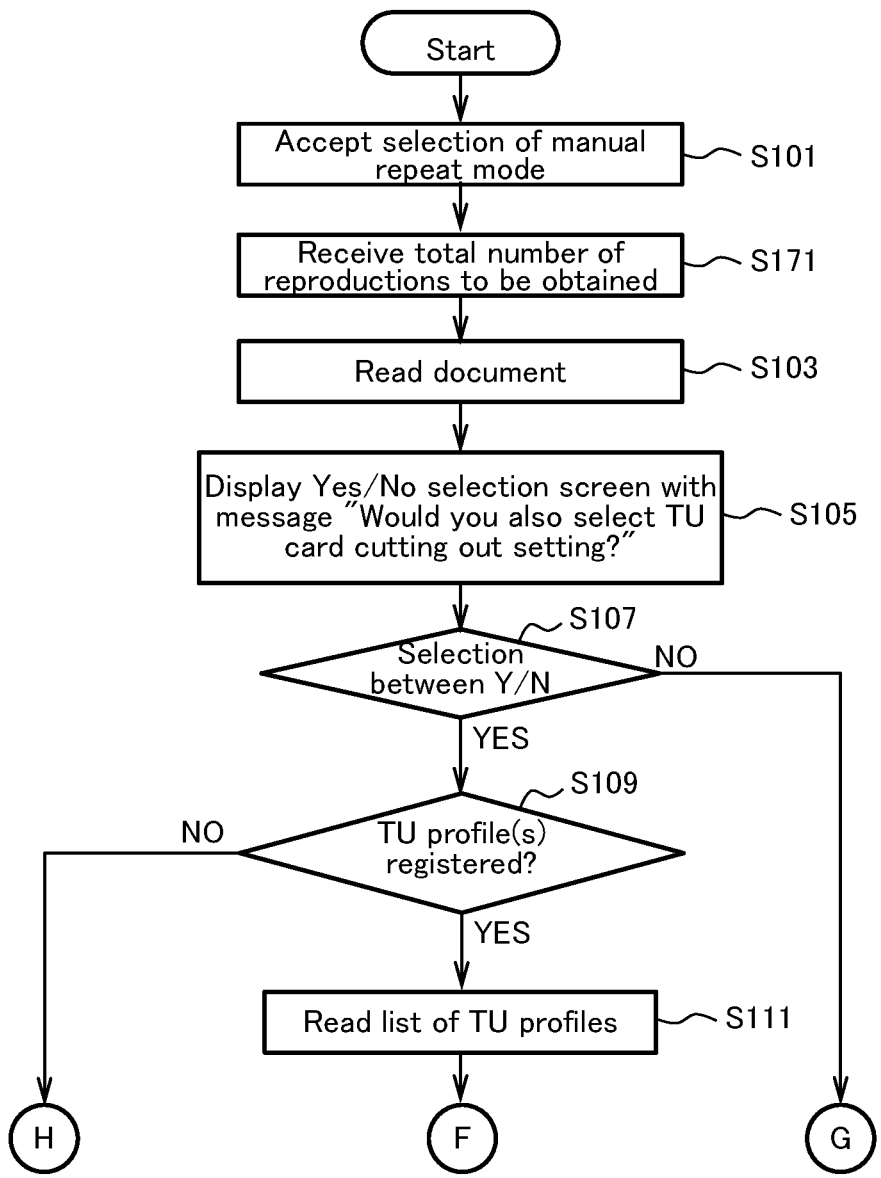
FIG. 13A is a flowchart (part 1) illustrating processing to be performed by an image forming apparatus of an image forming system according to a sixth embodiment.

FIGS. 13A and 13B illustrate a flowchart illustrating processing to be performed by image forming apparatus 100 of image forming system 400 according to the sixth embodiment. Note that the same processing as one in FIGS. 9A and 9B will be given the same reference sign and description thereof will be omitted as appropriate.

Repeat setting part 191a of image forming apparatus 100 receives (step S171) a setting of the total number of reproductions to be obtained, via operation panel 180. Repeat setting part 191a receives a setting of 100 (pieces), for example.

Then, coordination part 191b of image forming apparatus 100 performs step S115 and step S117 and presents, in the list of the profiles satisfying the condition checked in step S115 for a scan image size of [primary scanning direction scan size: 85 mm]×[sub-scanning direction scan size: 50 mm], profiles that satisfies a condition that the number of reproductions will be equal to or greater than 100 set as the total number of reproductions to be obtained, in a manner that only the profiles satisfying this condition are selectable.

FIG. 14 is an explanatory diagram illustrating a profile selection screen 183 displayed on operation panel 180. As illustrated in FIG. 14, profile selection screen 183 presents the content presented in profile selection screen 181, illustrated in FIG. 10, and a column representing the number of reproductions to be obtained (number of reproduced sheets to be obtained per one printing paper sheet), illustrated in FIG. 12.

Trimming setting part 261a of first post-processing apparatus 200 accepts (step S119), via profile selection screen 183 illustrated in FIG. 14, selection of either profile No. 1 "Business card UD" or profile No. 8 "Seal", and proceeds to step S173.

Repeat setting part 191a is configured to, in step S173, calculate the number N of copies of printed sheet. Repeat setting part 191a calculates (step S173) the number N of copies of printed sheet by dividing the total number of reproductions to be obtained by the number of reproductions to be obtained per one transfer paper sheet. For example, when profile No. 1 "Business card UD" is selected, repeat setting part 191a calculates a value of 7 as the number of copies of printed sheet by dividing a value of 100, representing the total number of reproductions to be obtained, by a value of 15, representing the number of reproductions to be obtained per one transfer paper sheet. When profile No. 8 "Seal" is selected, repeat setting part 191a calculates a value of 9 as the number of copies of printed sheet by dividing a value of 100, representing the total number of reproductions to be obtained, by a value of 12, representing the number of reproductions to be obtained per one transfer paper sheet. Note that the number N of copies is rounded up to an integer.

Next, repeat setting part 191a sets (step S175) the calculated number N of copies of printed sheet to image forming processor 130 and proceeds to step S121. Then, paper feeder 140 of image forming apparatus 100 starts (step S121) feeding the printing paper sheet(s) to image forming processor 130 to cause image forming processor 130 to start printing of the scan image.

Image forming processor 130 automatically starts printing (step S121) the scan image on the printing paper sheet for the calculated number of copies of printed sheet, and post-processing part 220 of first post-processing apparatus 200 performs trimming (step S123) to produce 100 reproductions of the business card or seal depending on the selected profile. Note that, regarding the number of copies of printed sheet and the trimming, for example, image forming system 400 may be configured to print the scan image for the total number of reproductions to be obtained and then perform trimming for that number or print the scan image for all the number of copies of printed sheet and perform trimming on all the copies of printed sheet, which may produce spare business card(s) or seal(s) depending on the selected profile.

Although embodiments of the present invention on have been described and illustrated in detail, the disclosed embodiments are made for purposes of illustration and example only and not limitation. The scope of the present invention should be interpreted by terms of the appended claims.

What is claimed is:

1. An image forming system in which an image forming apparatus is connected to a post-processing apparatus having a function of trimming, the image forming system comprising:
   a repeat setting part that determines settings for repeatedly arranging a scan image on a recording medium, the repeat setting part determines either:
      a setting of scan size dimensions of the scan image per one printed reproduction of the scan image, the one printed reproduction to be laid out by imposition of the scan image on the recording medium;
      or a setting of the imposition of the scan image on the recording medium according to the scan size dimensions of the scan image;
   a trimming setting part that determines either:
      a setting of card size dimensions of cards to be obtained by trimming the recording medium; or
      a setting of a trimming area for the cards; and
   a coordination part that coordinates the repeat setting part with the trimming setting part and
   wherein when a desired number of reproductions of the scan image to be obtained is less than the minimum number of reproductions to be obtained, the coordination part makes a notification prompting to change the setting of the scan size or the setting of the imposition.

2. The image forming system according to claim 1, wherein the repeat setting part determines the setting of the imposition of the scan image taking into account the trimming area, and
   wherein when a desired output cannot be obtained using the repeat setting part in combination with the trimming setting part, the coordination part makes a notification that the setting of the scan size dimensions or the setting of the imposition should be changed.

3. The image forming system according to claim 2, wherein the image forming system further comprises a storage that stores one or more profiles each of which represents a condition for trimming the recording medium to the cards having the card size, and
   wherein when performing the imposition of the scan image onto the recording medium is not possible with any of the one or more profiles, the trimming setting part creates a profile with which performing the imposition of the scan image onto the recording medium is possible.

4. The image forming system according to claim 2, wherein the card size dimensions of the cards to be obtained by the trimming or a card size taking into account the trimming area is adopted as the scan size dimensions of the scan image.

5. The image forming system according to claim 2, wherein the repeat setting part receives a setting of a total number of reproductions to be obtained for the cards and, when retrieving a profile with which a desired output can be obtained, calculates, according to the profile, a number of copies of printed sheet for the cards from a number of reproductions to be obtained per one sheet of recording medium and the total number of reproductions to be obtained.

6. The image forming system according to claim 1, wherein the repeat setting part determines the setting of the imposition of the scan image taking into account the trimming area, and
wherein when a desired output cannot be obtained using the repeat setting part in combination with the trimming setting part, the coordination part makes a notification that the setting of the card size dimensions of the cards to be obtained by the trimming or the setting of the trimming area for the cards should be changed.

7. An image forming system in which an image forming apparatus is connected to a post-processing apparatus having a function of trimming, the image forming system comprising:
   a repeat setting part that determines either: a setting of a scan size of a scan image per one printed reproduction of the scan image, the one printed reproduction being to be laid out by imposition of the scan image; or a setting of the imposition of the scan image according to the scan size of the scan image;
   a trimming setting part that determines either: a setting of a card size of cards to be obtained by trimming a recording medium; or a setting of a trimming area for the cards; and
   a coordination part that coordinates the repeat setting part and the trimming setting part;
   wherein the repeat setting part receives a setting of a minimum number of reproductions to be obtained as a number of reproductions of the scan image which are obtainable from one sheet of the recording medium, and
   wherein when a desired number of reproductions of the scan image to be obtained is less than the minimum number of reproductions to be obtained, the coordination part makes a notification prompting to change the setting of the scan size or the setting of the imposition, and
   wherein when the desired number of reproductions of the scan image to be obtained is greater than or equal to the minimum number of reproductions to be obtained, the coordination part makes a notification prompting to change the setting of the card size or the setting of the trimming area for the cards.

8. A method of determining settings of an image forming system in which an image forming apparatus is connected to a post-processing apparatus having a function of trimming, the method comprising:
   a scanning setting determination step of determining either (i) a setting of scan size dimensions of a scan image per one printed reproduction of the scan image, the one printed reproduction to be laid out by imposition of the scan image on a recording medium, or (ii) a setting of the imposition of the scan image on the recording medium according to the scan size dimensions of the scan image;
   a trimming setting determination step of determining either a setting of card size dimensions of cards to be obtained by trimming the recording medium or a setting of a trimming area for the cards; and
   a coordination step of coordinating the scanning setting determination step with the trimming setting determination step; and
   wherein when a desired number of reproductions of the scan image to be obtained is less than the minimum number of reproductions to be obtained, the coordination step makes a notification prompting to change the setting of the scan size or the setting of the imposition.

* * * * *